United States Patent
Hasegawa et al.

(10) Patent No.: US 6,847,356 B1
(45) Date of Patent: Jan. 25, 2005

(54) COORDINATE INPUT DEVICE AND ITS CONTROL METHOD, AND COMPUTER READABLE MEMORY

(75) Inventors: Masahide Hasegawa, Yokohama (JP); Kiwamu Kobayashi, Yokohama (JP); Masaaki Kanashiki, Yokohama (JP); Atsushi Tanaka, Yamato (JP); Yuichiro Yoshimura, Kamakura (JP); Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 09/635,353

(22) Filed: Aug. 9, 2000

(30) Foreign Application Priority Data

Aug. 13, 1999 (JP) ........................................... 11-229281
Oct. 12, 1999 (JP) ........................................... 11-290089

(51) Int. Cl.[7] ............................................... G09G 5/00
(52) U.S. Cl. ...................... 345/176; 345/175; 345/166; 345/157
(58) Field of Search ................................ 345/176, 166, 345/175, 157, 158, 180, 183, 179, 181, 182, 207; 356/375; 178/18.01, 18.09

(56) References Cited

U.S. PATENT DOCUMENTS

| 5,115,230 A | 5/1992 | Smoot |
| 5,235,363 A | 8/1993 | Vogeley et al. |
| 5,499,098 A | * 3/1996 | Ogawa |
| 5,502,568 A | * 3/1996 | Ogawa et al. ............... 356/620 |
| 5,523,844 A | 6/1996 | Hasegawa et al. |
| 6,229,601 B1 | * 5/2001 | Hasegawa |

FOREIGN PATENT DOCUMENTS

| JP | 05-224636 | 9/1993 |
| JP | 06-274266 | 9/1994 |
| JP | 07-076902 | 8/1995 |

* cited by examiner

Primary Examiner—Matthew C. Bella
Assistant Examiner—Hau Nguyen
(74) Attorney, Agent, or Firm—Fitzpatrick, Cella, Harper & Scinto

(57) ABSTRACT

A device has a projection type image display unit which has a projection lens and generates a coordinate input screen, and linear sensors for sensing an image of a beam spot, and computes a coordinate value corresponding to the beam spot on the basis of information obtained by the projection type image display unit and the output signals from the linear sensors. This beam spot is generated by irradiating the predetermined position on the coordinate input screen with light coming from a pointing tool, or corresponds to a light-emitting portion provided to the distal end of the pointing tool located near the coordinate input screen.

23 Claims, 15 Drawing Sheets

FIG. 3

| SWITCH A | SWITCH B | SWITCH C | SWITCH D | EMISSION | PEN DOWN | PEN BUTTON |
|---|---|---|---|---|---|---|
| × | × | — | — | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | — | — | ON | ON | ON |
| × | ○ | — | — | ON | ON | OFF |

F I G. 14
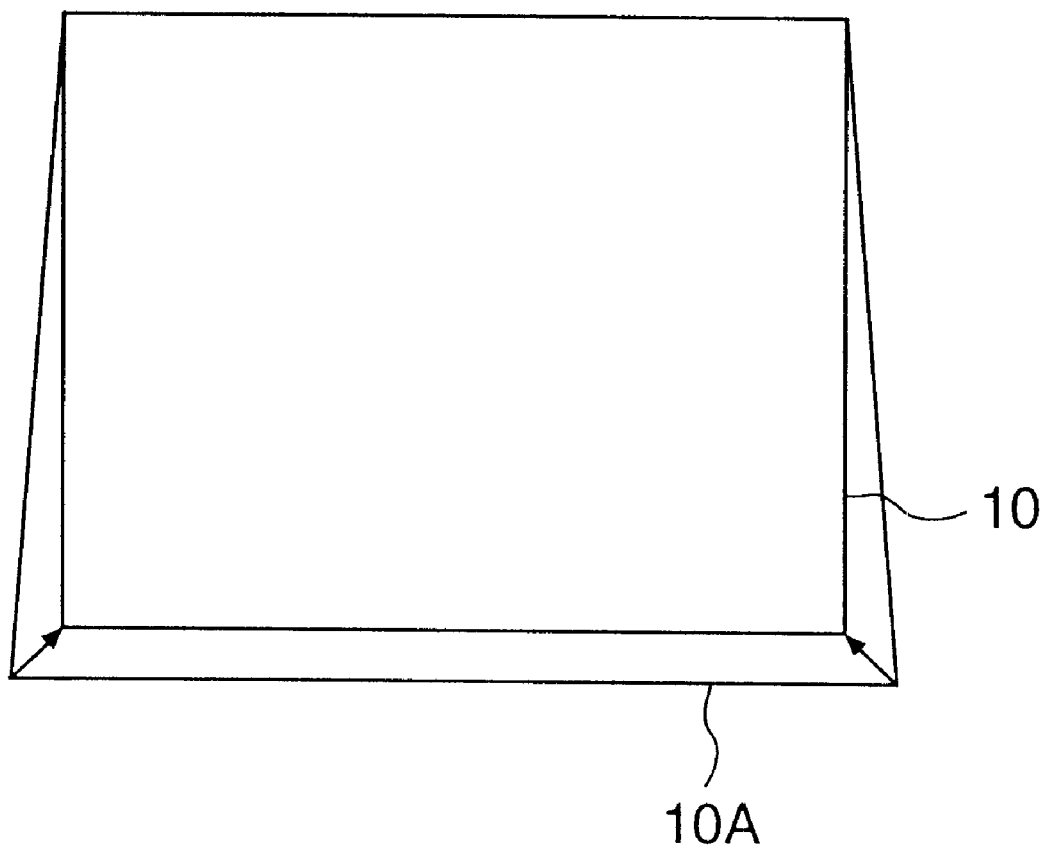

COORDINATE INPUT DEVICE AND ITS CONTROL METHOD, AND COMPUTER READABLE MEMORY

FIELD OF THE INVENTION

The present invention relates to a coordinate input device for generating a coordinate value corresponding to a beam spot which is generated by irradiating a predetermined position of a coordinate input screen with light coming from a pointing tool or corresponds to a light-emitting portion provided to the distal end of the pointing tool located near the coordinate input screen, its control method, and a computer readable memory.

BACKGROUND OF THE INVENTION

Conventionally, a coordinate input device used to control a computer connected and to write characters, figures, and the like by directly inputting a coordinate position using a pointing device on the screen of a large-scale display is known. As a coordinate input device of this type which adjusts itself in correspondence with a change in screen upon, e.g., zooming, a device that uses a position detection device (an analog device which outputs an output voltage corresponding to the spot position) called a PSD is known.

For example, Japanese Patent Publication No. 7-76902 discloses a device which detects a coordinate position by sensing an image of a beam spot formed by a collimated beam of visible light, and simultaneously transmits/receives control signals by infrared divergent light. Also, Japanese Patent Laid-Open No. 6-274266 discloses a device which detects a coordinate position using a linear CCD sensor and special optical mask. Furthermore, Japanese Patent Laid-Open No. 5-224636 discloses a device which inserts a half mirror into the optical path of a projection lens to form an image on the screen on a PSD, thus detecting the coordinate position.

In recent years, the brightness of the screen of a large-screen display has improved, and such display can be satisfactorily used even in a brightly illuminated environment. Also, since computers have prevailed, demands of such displays are increasing. Especially, in a presentation or meeting using a computer screen, a coordinate input device that can directly operate the screen is very convenient. Especially, a front projection type device is portable, and can be used while changing the screen size in correspondence with the location where it is used.

However, in the coordinate input device described in Japanese Patent Laid-Open No. 5-224636, the wavelength selective half mirror is inserted in the projection optical path, and may adversely influence the image quality of a projected image. To avoid such shortcoming, a high-precision mirror must be used. Also, an insertion space for the mirror is required between the projection lens and a liquid crystal panel. For this reason, a large projection lens size is required to assure a sufficient amount of light, resulting in high cost. Furthermore, a sensor which has a small size and is inexpensive compared to the liquid crystal panel can be used. However, to use such sensor, a reduction optical system is required. In order to assure sufficiently high brightness of an optical system on the sensor side that includes a reduction optical system, a reduction optical system with a large size is required, resulting in an expensive device.

SUMMARY OF THE INVENTION

The present invention has been made in consideration of the aforementioned problems, and has as its object to provide a high-resolving power, inexpensive coordinate input device and its control method, and a computer readable memory.

In order to achieve the above object, a coordinate input device according to the present invention comprises the following arrangement.

That is, a coordinate input device for generating a coordinate value corresponding to a beam spot which is generated by irradiating a predetermined position of a coordinate input screen with light coming from a pointing tool or corresponds to a light-emitting portion provided to a distal end of the pointing tool located near the coordinate input screen, comprises:

image display means, having an optical system, for generating the coordinate input screen;

image sensing means for sensing an image of the beam spot; and coordinate operation means for operating a coordinate value corresponding to the beam spot on the basis of information obtained from the image display means and an output signal from the image sensing means.

In order to achieve the above object, a method of controlling a coordinate input device according to the present invention comprises the following arrangement.

That is, a method of controlling a coordinate input device for generating a coordinate value corresponding to a beam spot which is generated by irradiating a predetermined position of a coordinate input screen with light coming from a pointing tool or corresponds to a light-emitting portion provided to a distal end of the pointing tool located near the coordinate input screen, comprises:

the image sensing step of sensing an image of the beam spot using an image sensing unit; and the coordinate operation step of operating a coordinate value corresponding to the beam spot on the basis of information obtained from an image display unit having an optical system for generating the coordinate input screen, and an output signal from the image sensing unit.

In order to achieve the above object, a computer readable memory according to the present invention comprises the following arrangement.

That is, a computer readable memory that stores a program of control of a coordinate input device for generating a beam spot by irradiating a predetermined position of a coordinate input screen with light coming from a pointing tool, and generating a coordinate value corresponding to the beam spot, comprises:

a program code of the image sensing step of sensing an image of the beam spot using an image sensing unit; and a program code of the coordinate operation step of operating a coordinate value corresponding to the beam spot on the basis of information obtained from an image display unit having an optical system for generating the coordinate input screen, and an output signal from the image sensing unit.

In order to achieve the above object, a coordinate input device according to the present invention comprises the following arrangement.

That is, a coordinate input device for generating a coordinate value corresponding to a beam spot which is generated by irradiating a predetermined position of a coordinate input screen with light coming from a pointing tool or corresponds to a light-emitting portion provided to a distal end of the pointing tool located near the coordinate input screen, comprises:

image display means, having an optical system, for generating the coordinate input screen;

first image sensing means, constructed by a first sensor on a first coordinate axis, for sensing an image of the beam spot;

second image sensing means, constructed by a second sensor on a second coordinate axis, for sensing an image of the beam spot; and coordinate operation means for operating a coordinate value corresponding to the beam spot on the basis of output signals from the first and second image sensing means, and the first and second coordinate axes are perpendicular to each other, and at least one of the first and second sensors is set with a predetermined direction position on the coordinate axis thereof substantially agreeing with an optical axis of the optical system.

In order to achieve the above object, a method of controlling a coordinate input device according to the present invention comprises the following arrangement.

That is, a method of controlling a coordinate input device for generating a coordinate value corresponding to a beam spot which is generated by irradiating a predetermined position of a coordinate input screen with light coming from a pointing tool or corresponds to a light-emitting portion provided to a distal end of the pointing tool located near the coordinate input screen, comprises:

the first image sensing step of sensing an image of the beam spot using a first image sensing unit constructed by a first sensor on a first coordinate axis;

the second image sensing step of sensing an image of the beam spot using a second image sensing unit constructed by a second sensor on a second coordinate axis; and the coordinate operation step of operating a coordinate value corresponding to the beam spot on the basis of output signals from the first and second image sensing steps, and the first and second coordinate axes are perpendicular to each other, and at least one of the first and second sensors is set with a predetermined direction position on the coordinate axis thereof substantially agreeing with an optical axis of the optical system.

In order to achieve the above object, a computer readable memory according to the present invention comprises the following arrangement.

That is, a computer readable memory that stores a program code of control of a coordinate input device for generating a beam spot by irradiating a predetermined position of a coordinate input screen with light coming from a pointing tool, and generating a coordinate value corresponding to the beam spot, comprises:

a program code of the first image sensing step of sensing an image of the beam spot using a first image sensing unit constructed by a first sensor on a first coordinate axis;

a program code of the second image sensing step of sensing an image of the beam spot using a second image sensing unit constructed by a second sensor on a second coordinate axis; and a program code of the coordinate operation step of operating a coordinate value corresponding to the beam spot on the basis of output signals from the first and second image sensing steps, and the first and second coordinate axes are perpendicular to each other, and at least one of the first and second sensors is set with a predetermined direction position on the coordinate axis thereof substantially agreeing with an optical axis of the optical system.

In order to achieve the above object, a coordinate input device according to the present invention comprises the following arrangement.

That is, a coordinate input device which comprises projection type image display means, a pointing tool which generates a beam spot at an arbitrary position within a predetermined coordinate input region including an image display region of the projection type image display means or has at a distal end thereof a light-emitting portion that serves as a beam spot when the pointing tool is located near a coordinate input screen, and image sensing means for sensing an image of the beam spot, comprises:

detection means for detecting a field angle and/or a distortion correction state of a projection optical system of the projection type image display means, and outputting correction information; and coordinate operation means for generating a coordinate output signal corresponding to a position of the beam spot within the coordinate input region on the basis of a signal sensed by the image sensing means using the correction information output from the detection means.

In order to achieve the above object, a coordinate input device according to the present invention comprises the following arrangement.

That is, a coordinate input device which comprises projection type image display means, a pointing tool which generates a beam spot at an arbitrary position within a predetermined coordinate input region including an image display region of the projection type image display means or has at a distal end thereof a light-emitting portion that serves as a beam spot when the pointing tool is located near a coordinate input screen, and image sensing means for sensing an image of the beam spot, comprises:

coordinate operation means for generating a coordinate output signal corresponding to a position of the beam spot within the coordinate input region on the basis of a signal sensed by the image sensing means using screen correction information of a size of a displayed image and/or distortion of the projection type image display means.

In order to achieve the above object, a method of controlling a coordinate input device according to the present invention comprises the following arrangement.

That is, a method of controlling a coordinate input device which comprises a projection type image display unit, a pointing tool which generates a beam spot at an arbitrary position within a predetermined coordinate input region including an image display region of the projection type image display means or has at a distal end thereof a light-emitting portion that serves as a beam spot when the pointing tool is located near a coordinate input screen, and an image sensing unit for sensing an image of the beam spot, comprises:

the detection step of detecting a field angle and/or a distortion correction state of a projection optical system of the projection type image display unit, and outputting correction information; and the coordinate operation step of generating a coordinate output signal corresponding to a position of the beam spot within the coordinate input region on the basis of a signal sensed by the image sensing unit using the correction information output from the detection step.

In order to achieve the above object, a method of controlling a coordinate input device according to the present invention comprises the following arrangement.

That is, a method of controlling a coordinate input device which comprises a projection type image display unit, a pointing tool which generates a beam spot at an arbitrary position within a predetermined coordinate input region including an image display region of the projection type image display means or has at a distal end thereof a light-emitting portion that serves as a beam spot when the pointing tool is located near a coordinate input screen, and an image sensing unit for sensing an image of the beam spot, comprises:

the acquisition step of acquiring screen correction information of a size of a displayed image and/or distortion of the projection type image display unit; and the coordinate operation step of generating a coordinate output signal corresponding to a position of the beam spot within the coordinate input region on the basis of a signal sensed by the image sensing unit using the screen correction information.

In order to achieve the above object, a computer readable memory according to the present invention comprises the following arrangement.

That is, a computer readable memory that stores a program code of control of a coordinate input device which comprises a projection type image display unit, a pointing tool for generating a beam spot at an arbitrary position within a predetermined coordinate input region including an image display region of the projection type image display unit, and an image sensing unit for sensing an image of the beam spot, comprises:

a program code of the detection step of detecting a field angle and/or a distortion correction state of a projection optical system of the projection type image display unit, and outputting correction information; and a program code of the coordinate operation step of generating a coordinate output signal corresponding to a position of the beam spot within the coordinate input region on the basis of a signal sensed by the image sensing unit using the correction information output from the detection step.

In order to achieve the above object, a computer readable memory according to the present invention comprises the following arrangement.

That is, a computer readable memory that stores a program code of control of a coordinate input device which comprises a projection type image display unit, a pointing tool which generates a beam spot at an arbitrary position within a predetermined coordinate input region including an image display region of the projection type image display means or has at a distal end thereof a light-emitting portion that serves as a beam spot when the pointing tool is located near a coordinate input screen, and an image sensing unit for sensing an image of the beam spot, comprises:

a program code of the acquisition step of acquiring screen correction information of a size of a displayed image and/or distortion of the projection type image display unit; and a program code of the coordinate operation step of generating a coordinate output signal corresponding to a position of the beam spot within the coordinate input region on the basis of a signal sensed by the image sensing unit using the screen correction information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing the operation mode of the pointing tool of the first embodiment;

FIG. 14 is a view for explaining electronic trapezoidal distortion correction according to the third embodiment of the present invention.

DESCRIPTION OF THE PREFERRED EMBODIMENTS

The preferred embodiments of the present invention will be described in detail hereinafter with reference to the accompanying drawings.

A schematic arrangement of an optical coordinate input device according to the present invention will be explained first using FIG. 1.

[First Embodiment]

Figure 1:
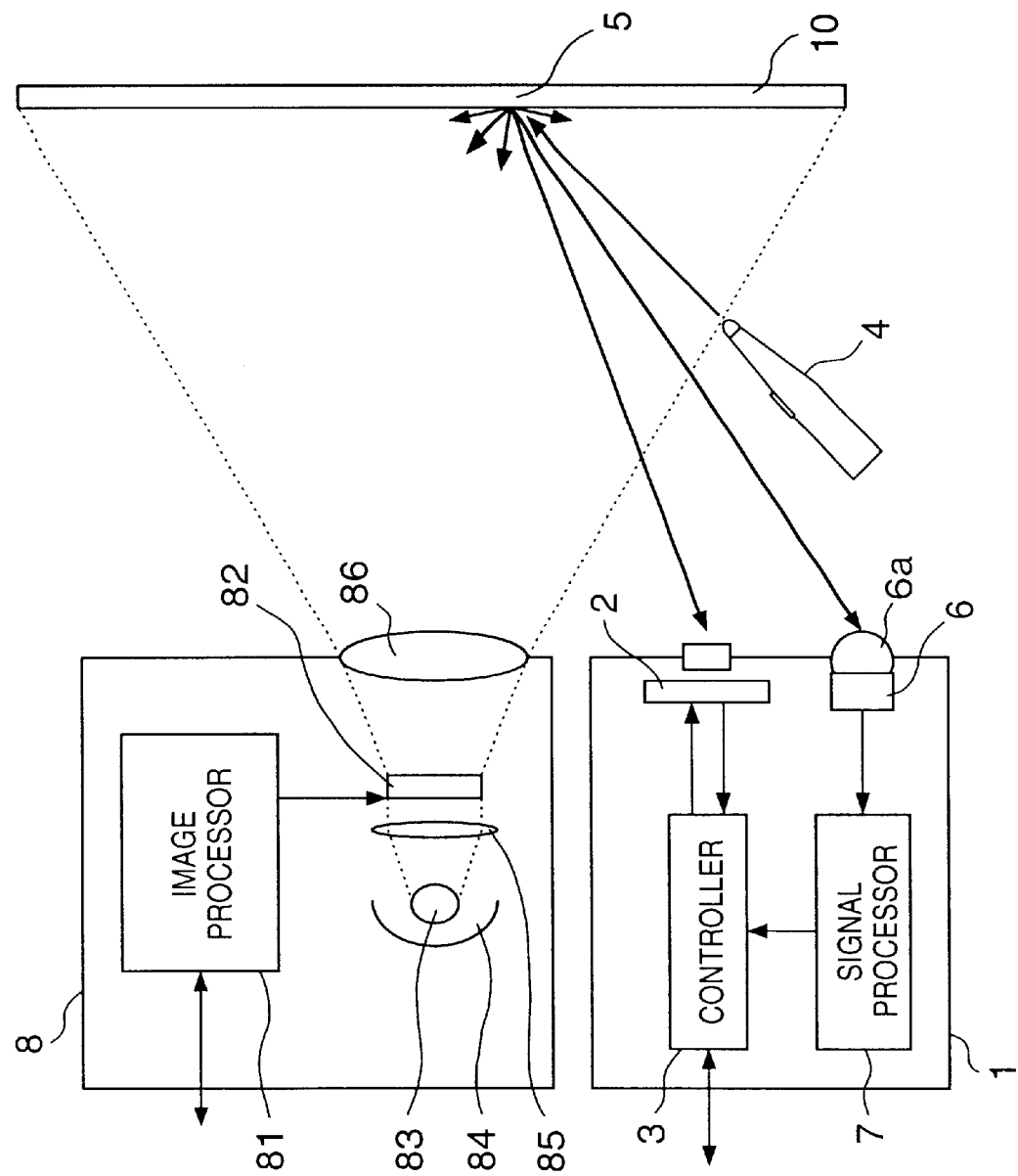
FIG. 1 is a schematic view showing the arrangement of a coordinate input device according to the first embodiment of the present invention.

FIG. 1 shows a schematic arrangement of a coordinate input device of the first embodiment.

The coordinate input device of this embodiment is primarily constructed by a pointing tool 4 for forming a beam 5 on a reflecting screen 10 as a coordinate input surface, and a coordinate detector 1 for detecting the coordinate position and the like of the beam spot 5 on the reflecting screen 10. FIG. 1 also shows a projection display device 8 for displaying an image, a coordinate position, or the like on the reflecting screen 10 as an output device, together with the arrangements of those components.

The coordinate detector 1 comprises a coordinate detection sensor unit 2, a controller 3 for controlling the coordinate detection sensor unit 2, and making coordinate operations and the like, a light-receiving element 6, and a signal processor 7. By detecting the coordinate position of the beam spot 5 on the reflecting screen 10, and control signals corresponding to the states of individual switches (to be described later) of the pointing tool 4, the controller 3 sends that information to an externally connected device (not shown).

The projection display device 8 comprises an image signal processor 81 which receives an image signal from a display signal source as an externally connected device such as a host computer (not shown) or the like, a liquid crystal panel 82 controlled by the image signal processor 81, an illumination optical system including a lamp 83, mirror 84, and condenser lens 85, and a projection lens 86 for projecting an image formed by the liquid crystal panel 82 onto the reflecting screen 10, and can display desired image information on the reflecting screen 10.

Since the reflecting screen 10 has appropriate light diffusion characteristics to broaden the observation range of the projected image, a light beam emitted by the pointing tool 4 is diffused at the position of the beam spot 5, and some light components of the light diffused at the position of the beam spot 5 enter the coordinate detector 1 irrespective of the position on the screen or the direction of the light beam.

With this arrangement, the operator inputs character information or line image information using the pointing tool 4 on the reflecting screen 10, and displays the input information by the projection display device 8, thus inputting/outputting information like when he or she uses "paper & pencil", and also freely allowing button operations and input operations for, e.g., selecting and determining icons.

<Detailed Description of Pointing Tool 4>

Figure 2:
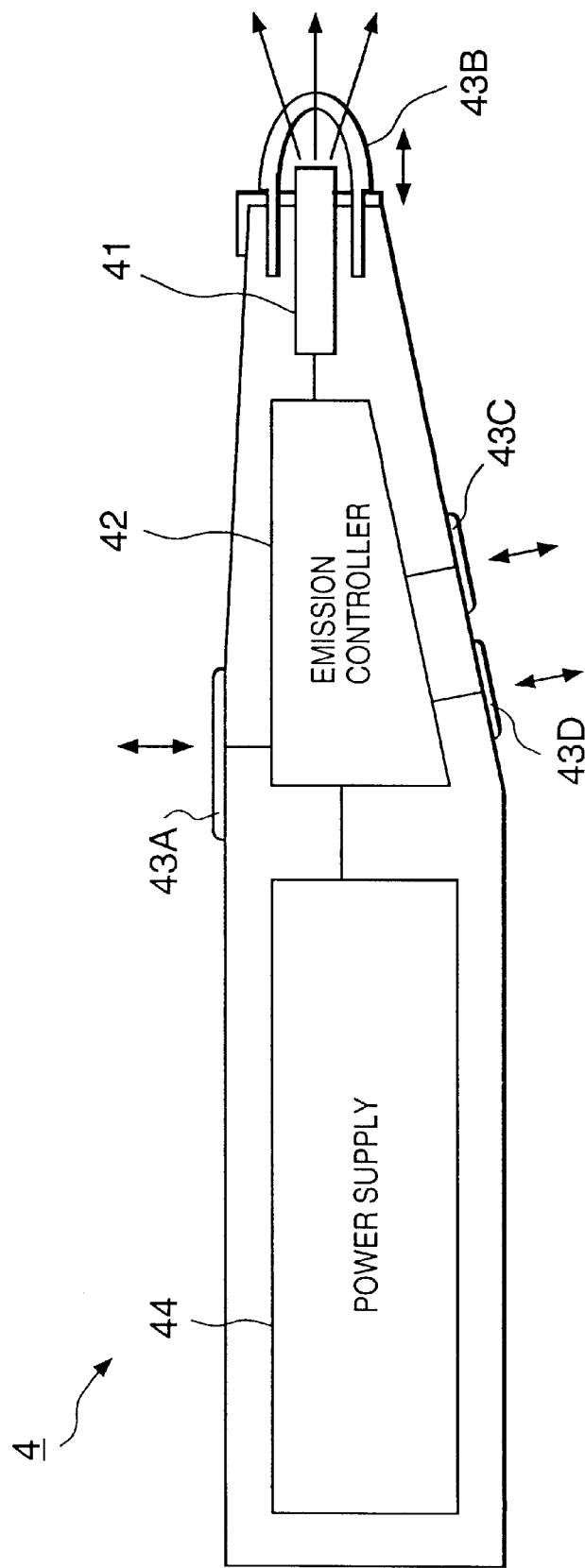
FIG. 2 is a view showing the arrangement of a pointing tool of the first embodiment in detail.

FIG. 2 shows the arrangement of the pointing tool of the first embodiment in detail.

The pointing tool 4 incorporates a light-emitting element 41 such as a semiconductor laser for emitting a light beam or an LED or the like for emitting infrared light, an emission controller 42 for controlling to drive the light-emitting element 41, operation switches 43A to 43D, a power supply 44 such as a battery, and a cap 46 which consists of a detachable transparent member that covers the light-emitting element 41. The emission controller 42 controls to turn on/off emission in correspondence with the states of the operation switches 43A to 43D, and controls emission by superposing a control signal in accordance with a given modulation method (to be described later).

FIG. 3 is a table showing the operation mode of the pointing tool of the first embodiment.

Switches A to D correspond to the switches 43A to 43D shown in FIG. 2. Note that "emission" corresponds to an emission signal (coordinate signal), and "pen down" and "pen button" correspond to control signals.

The operator holds the pointing tool 4 and directs its distal end toward the reflecting screen 10. At this time, infrared light 45 is emitted by pressing the switch 43A, which is located at a position where the operator can naturally touch it with his or her thumb. In this manner, the beam spot 5 is formed on the reflecting screen 10, and a coordinate signal begins to be output by a predetermined process. In this state, pen-down and pen-button control signals are kept OFF. For this reason, only indication of the pointed position upon moving a cursor or switching a highlight portion of buttons is made for the operator on the reflecting screen 10.

By pressing the switch 43C and 43D which are located at positions where the operator can naturally touch them with his or her index and middle fingers, pen-down and pen-button control signals are superposed on the emission signal, as shown in FIG. 3. More specifically, upon pressing the switch 43C, a pen-down state is set, and screen control for beginning input of a character or line image or selecting and determining a button can be executed. Upon pressing the switch 43D, a pen-button state is set, another function of, e.g., calling a menu can be implemented. In this manner, the operator can easily operate by quickly and accurately drawing a character or figure at an arbitrary position on the reflecting screen 10, or selecting a button or menu by one-handed operation.

The switch 43B is provided to the distal end of the pointing tool 4, and is turned on when it is pressed against the reflecting screen 10. When the operator holds the pointing tool 4 and presses the distal end of the pointing tool against the reflecting screen 10, the pen-down state is set, and the operator can make natural pen input operation without extra button operations.

The switch 43A has a role of a pen button. Of course, when the operator presses the switch 43A without pressing the tool 4 against the screen, he or she can move only the cursor. In practice, input of a character or figure by directly touching the screen can assure higher operability and accuracy than that done at a position separated from the screen. The first embodiment allows natural, easy operations using the four switches even when the operator is separated from the screen or stands immediately before the screen, thus allowing selective use depending on situations. Furthermore, if the pointing tool is dedicated to direct input (it is not used as a pointer), a divergent light source can be used in place of a light beam, and an LED which is more inexpensive and has longer service life than a semiconductor laser can be used.

In order to use two different pointing tools 4, i.e., nearby and remote tools, to allow two or more persons to simultaneously operate pointing tools, or to use a plurality of pointing tools 4 having different attributes, e.g., colors, widths, and the like, the emission controller 42 is set to send a unique ID number together with control signals. In correspondence with the sent ID number, attributes such as the width, color, and the like of a line to be drawn are determined by, e.g., software on the externally connected device side, and setups can be changed by buttons, menus, and the like on the reflecting screen 10. Such operation may be implemented by sensing a change instruction signal by adding another operation button or the like to the pointing tool 4. Also, the setups may be held in the pointing tool 4 or coordinate detector 1, and attribute information may be sent to the externally connected device in place of the ID number.

Such additional operation button can be set to implement other functions, e.g., flickering of a display device, switching of a signal source, operations of a video recording device, and the like. Furthermore, by a pressure detection means to one or both of the switches 43A and 43B, the writing pressure may be detected, and this writing pressure data may be sent together with control signals. In this manner, various effective signals can be sent.

Figure 5:
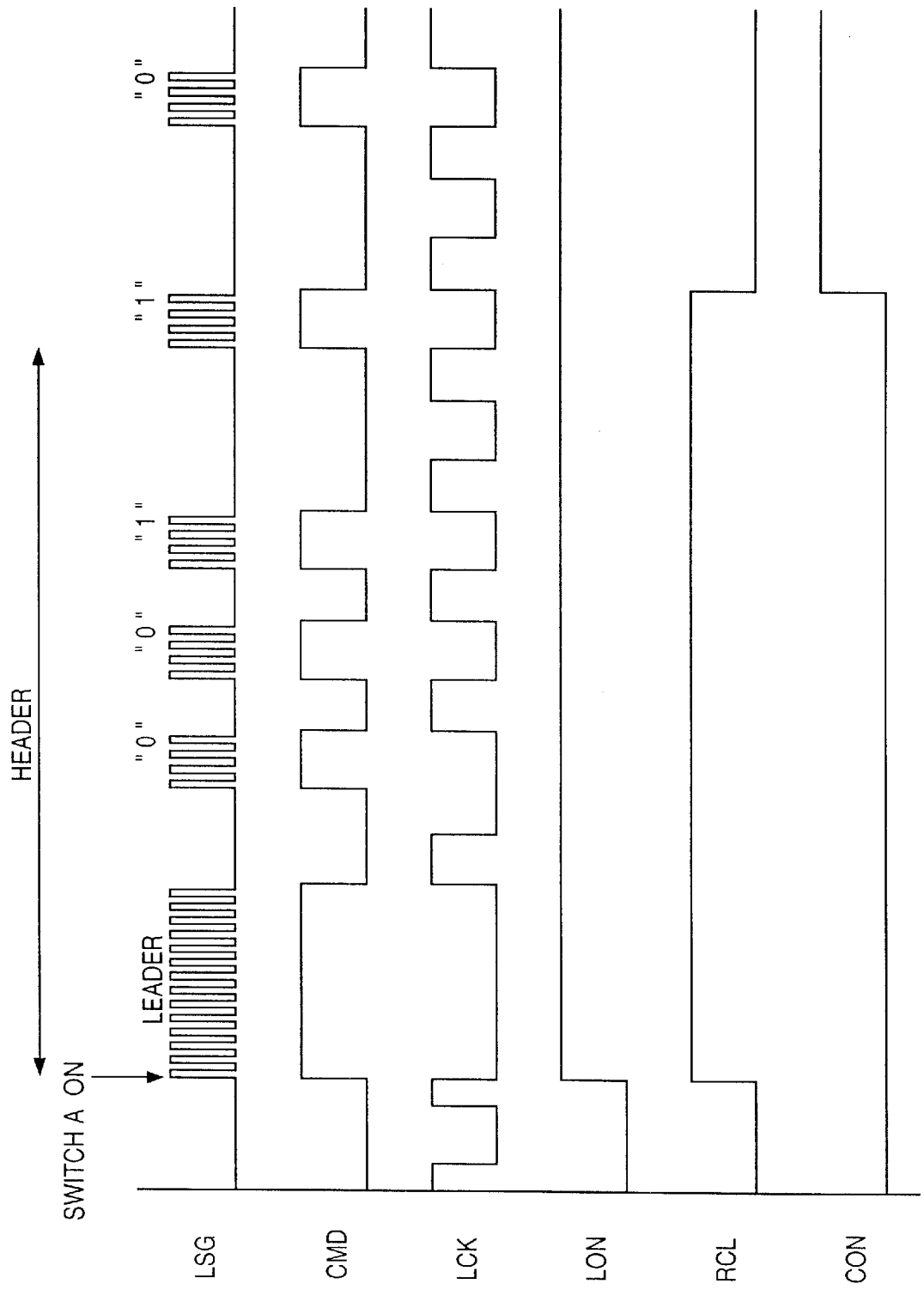
FIG. 5 is a timing chart in the decoding operation of a control signal in the first embodiment.

When the switch 43A or 43B of the pointing tool 4 is turned on, emission starts, and the emission signal outputs first a header which is made up of a leader consisting of a relatively long, successive pulse train, and a code (manufacturer ID or the like) that follows the leader, and then sequentially outputs a transmission data sequence including a pen ID, control signals, and the like in accordance with a pre-defined order and format (see a signal LSG in FIG. 5).

In the first embodiment, bit "1" of respective data bits is formed to have an interval twice that of bit "0" by a given modulation scheme, but various data encoding schemes can be used. However, as will be described later, since it is preferable that the average amount of light be constant to attain coordinate detection and clock components be sufficiently large to lock PLL, and since a relatively high redundancy can be set in terms of the data size to be sent, 6-bit (64) data is encoded by assigning it to 108 codes, which include the same numbers of "1"s and "0"s and whose "1" or "0" run lengths are 3 or less, in 10-bit long codes, in the first embodiment. With such encoding scheme, since the average electric power can become constant, and sufficiently large clock components are included, a stable synchronization signal can be easily generated upon demodulation.

As described above, each of pen-down and pen-button control signals consists of 2 bits but other long data such as an ID and the like must also be sent. Hence, in the first embodiment, one block data is defined by 24 bits, in which first 2 bits are assigned to a control signal, the next 2 bits to a content identification code (e.g., a writing pressure signal= 00, ID=11, and the like), the next 2 bits to a parity of such code, and 16-bit data and its parity then follow. Such data is encoded to a 40-bit long signal by the aforementioned scheme. A 10-bit long sync code is appended to the head of the 40-bit long signal. This sync code uses a special code, which includes runs of four "0"s and five "1"s or their inverted pattern (such patterns are switched depending on whether the end of the immediately preceding block is 1 or 0), and is easily identified from a data word, and data can be decoded by reliably identifying its position in the middle of a data sequence. Hence, one block corresponds to a 50-bit long transmission signal, and a control signal and data such as an ID, writing pressure, or the like are sent.

In the first embodiment, 7.5 kHz which are ⅛ 60 kHz (first frequency) are used as the second frequency. Since the aforementioned encoding scheme is used, the average transfer bit rate is 5 kHz which is ⅔ the second frequency. Furthermore, since one block is defined by 50 bits, 24-bit data per block is sent at 100 Hz. Hence, the effective bit rate except for a parity is 200 bits/sec. In this manner, the encoding scheme can prevent detection errors and attain easy synchronization by a very simple arrangement, although redundancy is high. Since both a phase lock signal for sensor control (to be described later) and checking of the repetition cycle of the sync code are used together, even a signal that has suffered a short dropout can be restored. Conversely, in practice, quick operations such as pen-up and double-tap operations can be reliably discriminated based on the presence/absence of a header signal.

<Detailed Description of Coordinate Detector 1>

Figure 4:
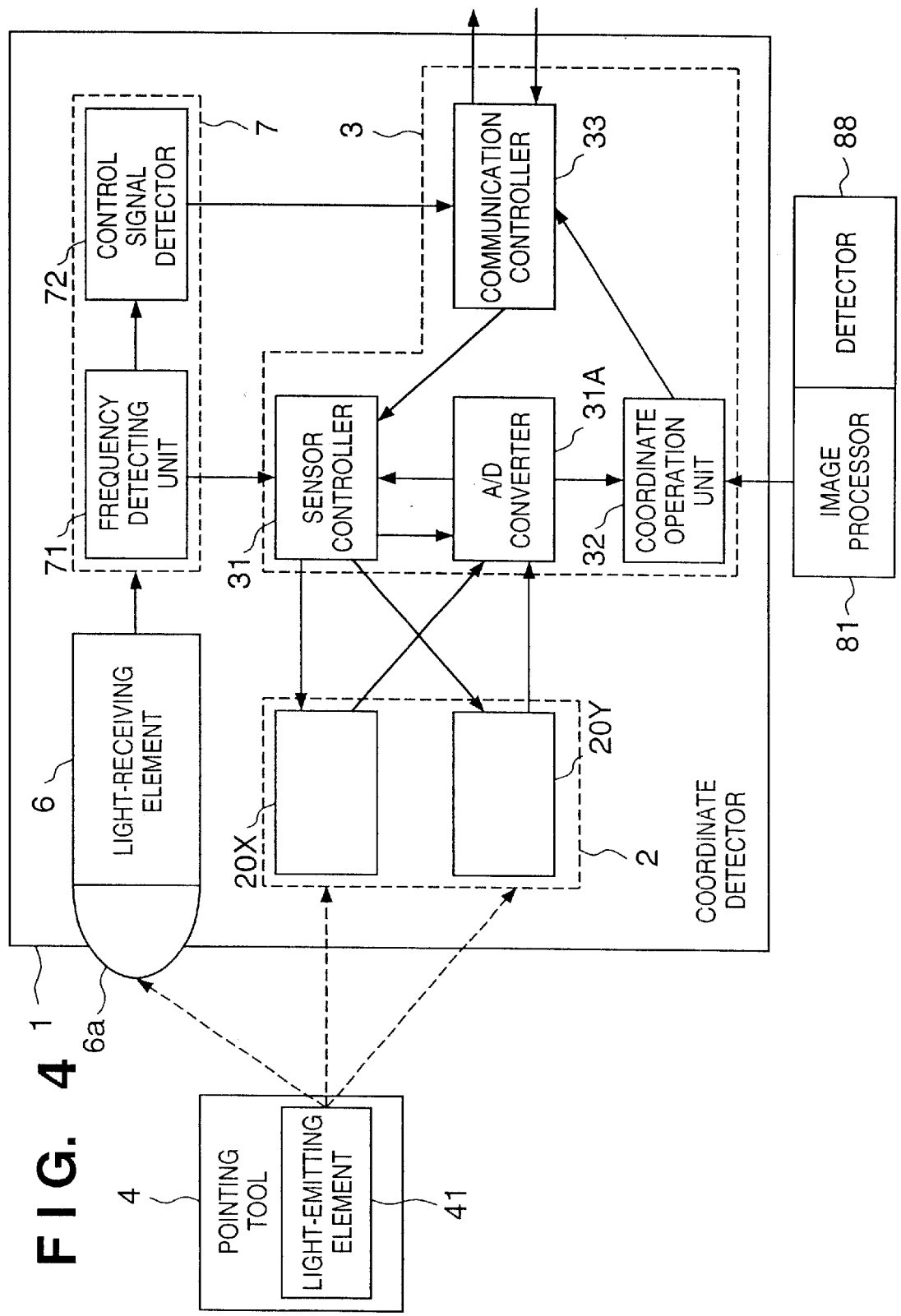
FIG. 4 is a block diagram showing the arrangement of a coordinate detector of the first embodiment in detail.

FIG. 4 shows the detailed arrangement of the coordinate detector of the first embodiment.

The coordinate detector 1 has the light-receiving element 6 for detecting the amount of light with high sensitivity by means of a focusing optical system, and two linear sensors 20X and 20Y for detecting the incoming direction of light by an imaging optical system. These light-receiving element and linear sensors respectively receive divergent light from the beam spot 5 formed on the reflecting screen 10 by the light beam coming from the light-emitting element 41 built in the pointing tool 4.

<Description of Operation of Focusing Optical System>

A focusing lens 6a serving as the focusing optical system is attached to the light-receiving element 6, and detects the amount of light having a predetermined wavelength at high sensitivity from the whole range on the reflecting screen 10. This detection output is detected by a frequency detecting unit 71, and is then demodulated by a control signal detector 72 into a digital signal including data such as a control signal (a signal superposed by the emission controller 42 of the pointing tool 4) and the like.

The timing chart in the decoding operation of this control signal will be explained below using FIG. 5.

FIG. 5 is a timing chart in the decoding operation of the control signal of the first embodiment.

The data signal consisting of the aforementioned bit sequence is detected as a light output signal LSG by the light-receiving element 6, and is detected by the frequency detecting unit 71. The frequency detecting unit 71 is designed to be locked with the pulse cycle of the first frequency, which is highest among the light output signal LSG, and demodulates a modulated signal CMD without being influenced by any disturbance light, when it is used together with an optical filter. This detecting method is the same as that of an infrared remote controller which is prevalently used, and is a highly reliable radio communication scheme.

In the first embodiment, 60 kHz as a frequency band higher than that of an infrared remote controller which is used prevalently are used as this first frequency so as to prevent operation errors even when a plurality of pointing tools are used at the same time. Alternatively, the first frequency may be set in the same frequency band as that of the infrared remote controller which is used prevalently, and in such case, operation errors are prevented by identifying pointing tools by IDs or the like.

The modulated signal CMD detected by the frequency detecting unit 71 is interpreted as digital data by the control signal detector 72 to decode a control signal (pen-down signal, pen-button signal, or the like mentioned above). The decoded control signal is sent to a communication controller 33. The cycle of code modulation as the second frequency included in the modulated signal CMD is detected by a sensor controller 31, and the linear sensors 20X and 20Y are controlled by this signal. That is, the sensor controller 31 is reset at the timing of the header shown in FIG. 5, and then generates a signal LCK which is phase-locked with the trailing edge of the modulated signal CMD.

Therefore, the generated signal LCK is a signal having a constant frequency, which is synchronized with the presence/absence of emission of the pointing tool 4. Also, a signal LON indicating the presence/absence of a light input, and a sensor reset signal RCL which is enabled by this signal LON are generated from the modulated signal CMD. The two linear sensors 20X and 20Y are reset during the high-level period of this sensor reset signal RCL, and start synchronous integration (to be described later) in response to the timing of the trailing edge of the sensor reset signal RCL, which is synchronized with the leading edge of the signal LCK.

On the other hand, when the control signal detector 72 detects a header, and confirms that the input is not a signal from another device or noise, but input from the pointing tool 4 has started actually, a signal indicating this confirmation is sent from the communication controller 33 to the sensor controller 31 to set a signal CON indicating effective operations of the linear sensors 20X and 20Y at high level, thus starting the operation of a coordinate operation unit 32.

Figure 6:
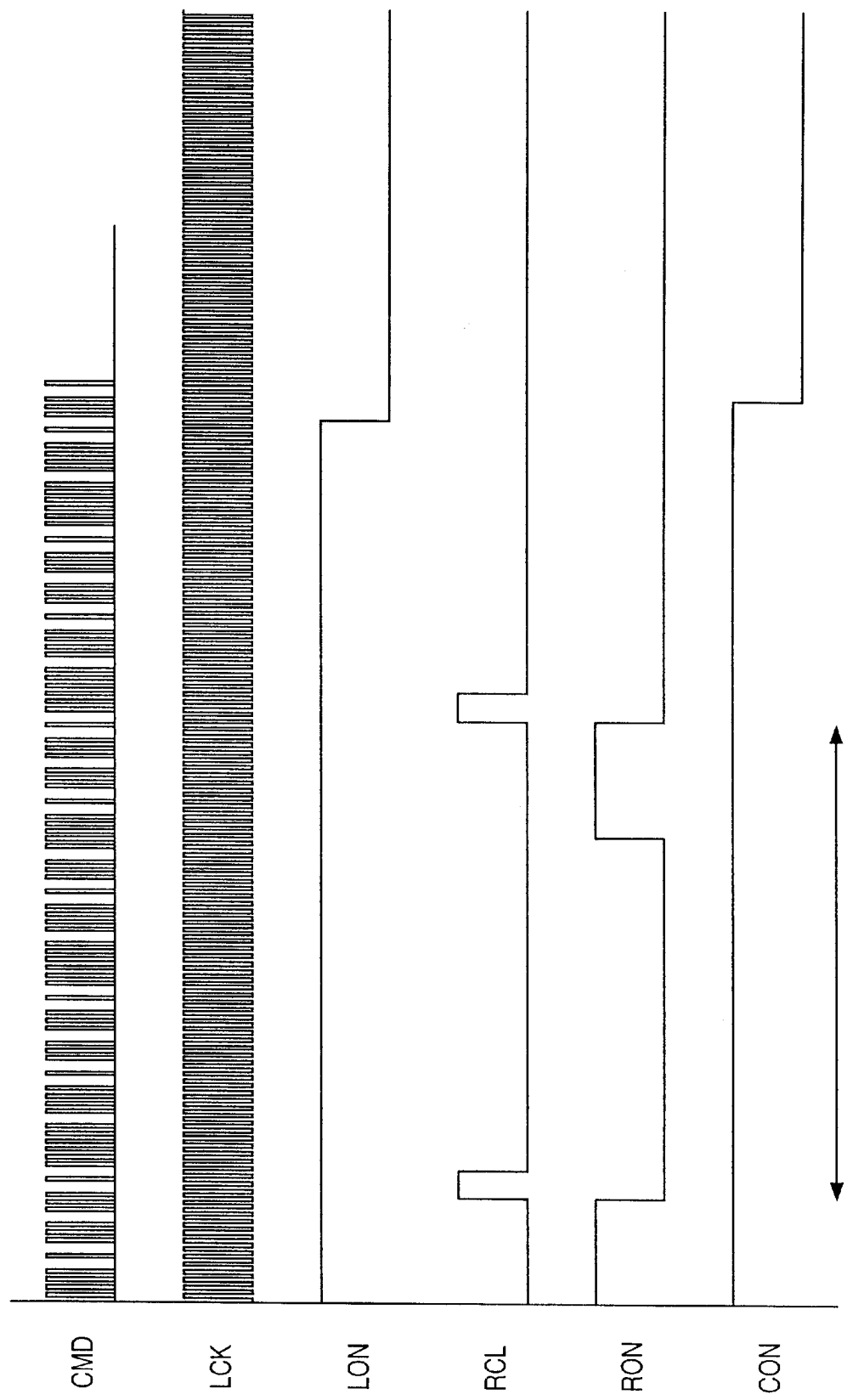
FIG. 6 is a timing chart of signals handled in the first embodiment.

FIG. 6 is a timing chart upon completion of a series of operations when the light output signal LSG disappears. When the modulated signal CMD detected from the light output signal LSG is kept at low level over a predetermined period of time, the signal LON indicating the presence/absence of the light input changes to low level, and the signal CON indicating effective sensor operations also changes to low level, thus ending the coordinate output operations by the linear sensors 20X and 20Y.

<Description of Operation of Imaging Optical System>

Figure 7:
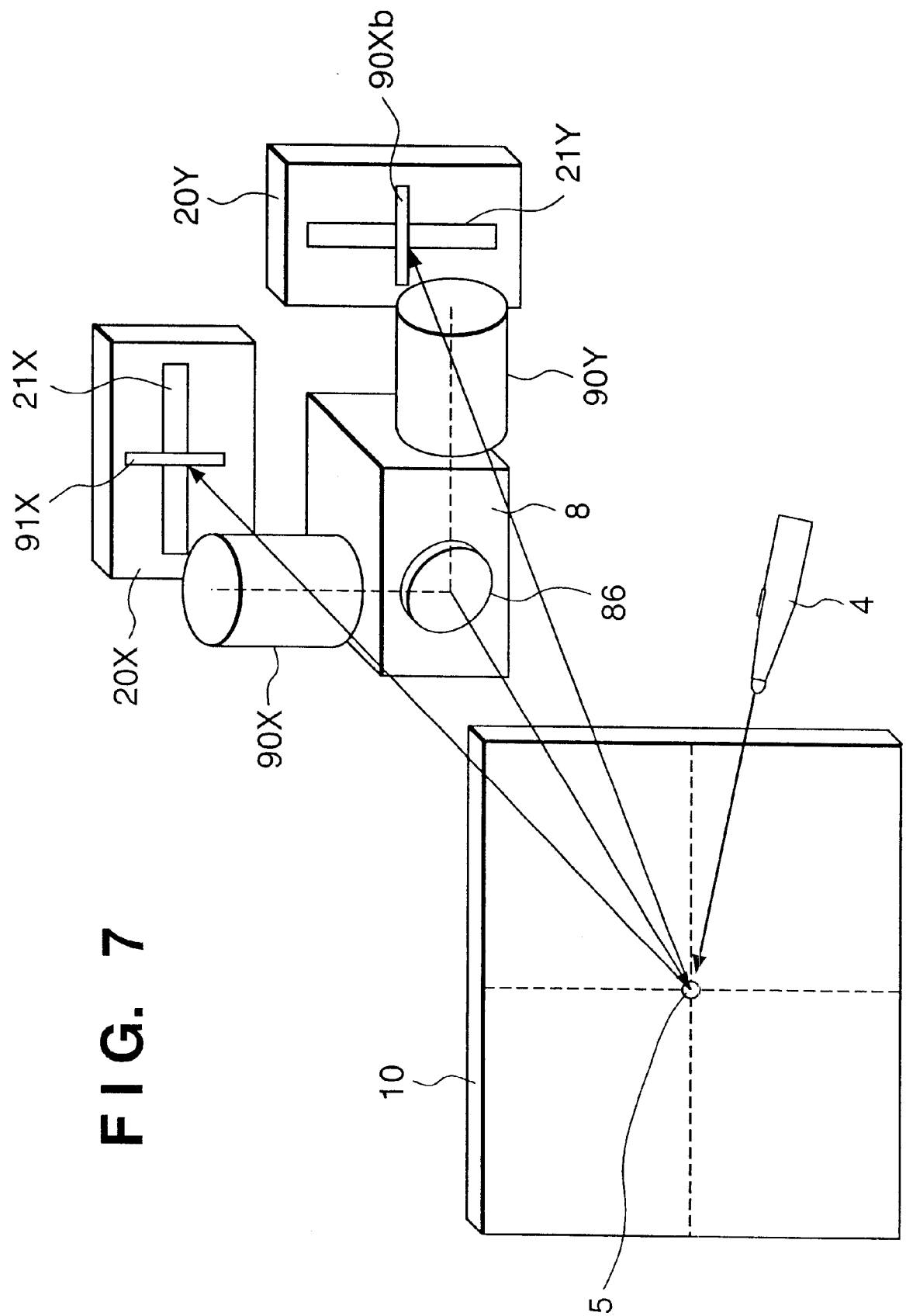
FIG. 7 is a view showing the positional relationship between linear sensors 20X and 20Y in the first embodiment.

FIG. 7 shows the positional relationship of the linear sensors 20X and 20Y in the first embodiment.

Referring to FIG. 7, cylindrical lenses 90X and 90Y serving as the imaging optical system form images of the beam spot 5 on photosensitive portions 21X and 21Y of the linear sensors 20X and 20Y as in linear patterns 91X and 91Y. By laying out the cylindrical lenses 90X and 90Y so their axial directions make right angles, outputs having peaks in pixels that reflect X- and Y-coordinates can be obtained. Furthermore, these lenses are laid out so their axes substantially intersect the optical axis of the projection lens 86.

With this layout, even when the distance to the reflecting screen 10 or the magnification of the projection lens 86 has changed, the coordinates of the projection lens 86 on the optical axis hardly change. However, since the field angle changes, magnification information corresponding to the field angle is detected by a detector 88 (FIG. 4) provided to the projection lens 86 and is sent from the image processor 81 to the coordinate operation unit 32 to make magnification correction (to be described later), thus always detecting coordinates with high accuracy even when the setting position has changed.

Even when the image processor 81 attains enlargement or position shift by a digital zoom function, magnification correction and shift correction can be attained by sensing such change amount to the coordinate operation unit 32. Of course, the same applies to a case wherein the projection lens 86 is shifted. Note that the detector 88 that detects the field angle and shift amount of the projection lens 86 uses a known means such as an encoder and the like. Also, the cylindrical lenses 90X and 90Y serving as the imaging optical system must be laid out to accurately make right angles, but the linear sensors 20X and 20Y have hardly any influence on coordinate detection even if they suffer slight errors. This is because linear images are formed on the linear sensors, and outputs can be obtained from a position proportional to motion on the reflecting screen 10 even when the linear sensors 20X and 20Y have slight tilts.

These two linear sensors 20X and 20Y are controlled by the sensor controller 31, and their output signals are sent to the coordinate operation unit 32 as digital signals converted by an A/D converter 31A connected to the sensor controller 31. The coordinate operation unit 32 computes an output coordinate value based on the input digital signals, and outputs the computation result to an external control device (not shown) via the communication controller 33 by a predetermined communication method together with data such as a control signal and the like from the control signal detector 72. When an operation unlike in a normal state (e.g., setting of a user calibration value) is done upon, e.g., adjustment, the communication controller 33 sends a mode switching signal to the sensor controller 31 and coordinate operation unit 32.

In the present invention, the image of the beam spot 5 is intentionally blurred by adjusting the positions of the cylindrical lenses 90X and 90Y so that it has an image width several times that of the pixels of each of the linear sensors 20X and 20Y. According to experiments that used plastic cylindrical lenses having a diameter of 1.5 mm, linear CCDs having a pixel pitch of about 15 $\mu$m and 64 effective pixels, and an infrared LED, if the sharpest image was formed, an image width of 15 $\mu$m or less was obtained over the field angle of around 40°. In such state, inter-pixel divisional operation results were distorted stepwise. Hence, when the lens positions were adjusted to obtain an image width falling with the range from 30 to 60 $\mu$m, very smooth coordinate data could be obtained. However, if the image is blurred too much, since the peak level lowers, an image width of about several pixels is optimal. When CCDs each having a small number of pixels and an appropriately blurred optical system are used, a coordinate input device which can reduce the computation data volume, and can assure very high resolving power, precision, and operation speed, and low cost using the compact sensors and optical system can be realized. As a means for obtaining such appropriately blurred optical system, a method of inserting light diffusion films in front of the lenses 90X and 90Y may be used in addition to the method of adjusting the lens positions.

As such light diffusion films, those made up of various materials such as PET, TAC, PC, urethane, and the like, and having different diffusion performances are commercially available. Also, light diffusion films prepared by mixing a diffusion material in an acrylic or glass planar member, or having diffusion characteristics by roughening surfaces are available. In the first embodiment, infrared transmission characteristics (wavelength selective transmittance) are provided to the lenses 90X and 90Y, but a PET light diffusion film may be adhered to an infrared transmission filter prepared by giving infrared transmission characteristics (wavelength selective transmittance) to an acrylic planar member. In such case, various characteristics can be selected by combining commercially available products. Furthermore, by mixing a diffusion material in an acrylic member for an infrared filter or roughening the surface of that member, a filter having appropriate characteristics can be manufactured while omitting the adhesion process.

When the light diffusion films are inserted on the light source side of the cylindrical lenses 90X and 90Y, since the size of incoming light is larger than each pixel, and is hardly influenced by the size of the micro structure (roughened surface or mixed diffusion material) of the diffusion material, an image is free from any distortion, and the coordinate precision is not adversely influenced.

The X-coordinate detection linear sensor array 20X has the same arrangement as that of the Y-coordinate detection linear sensor array 20Y, and their detailed arrangement will be explained below using FIG. 8.

Figure 8:
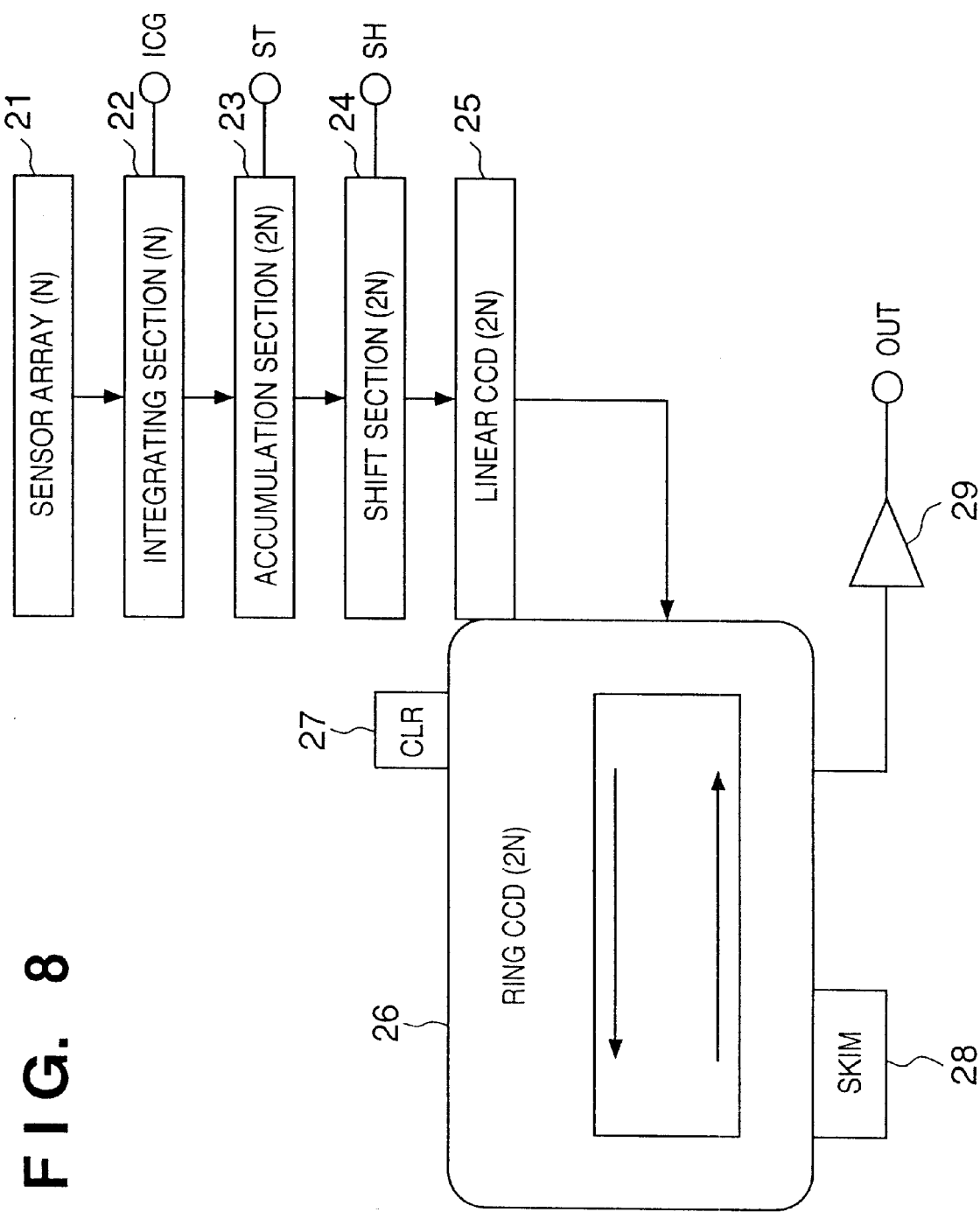
FIG. 8 is a diagram showing the arrangement of a linear sensor of the first embodiment in detail.

FIG. 8 shows the detailed arrangement of the linear sensor of the first embodiment.

A sensor array 21 serving as a light-receiving portion consists of N pixels (64 pixels in the first embodiment), and stores a charge corresponding to the received light amount in an integrating section 22. The integrating portion 22 consists of N blocks, and can be reset by applying a voltage to a gate ICG, thus allowing an electronic shutter operation. The charge stored in this integrating section 22 is transferred to an accumulation section 23 by applying a pulse voltage to an electrode ST. The accumulation section 23 consists of 2N blocks, which individually accumulate charges in correspondence with H (high level) and L (low level) of a signal IRCLK synchronous with the emission timing of the pointing tool 4. After that, the charges individually accumulated in synchronism with the ON and OFF timings of light are transferred to a linear CCD section 25 consisting of 2N blocks via a shift section 24 which consists of 2N blocks and facilitates transfer clocks.

In this manner, the linear CCD section 25 stores, in a line, pairs of charges of the sensor outputs from the N pixels, which correspond to the ON and OFF states of light. The charges stored in a line in the linear CCD section 25 are transferred in turn to a ring CCD section 26 consisting of 2N blocks. The ring CCD 26 is cleared by a CLR section 27 in response to a signal CLR, and sequentially accumulates charges transferred from the linear CCD section 25.

The charges accumulated in this manner are read by an amplifier 29. The amplifier 29 outputs a voltage proportional to the accumulated charge amount in a nondestructive manner. In practice, the amplifier 29 amplifies and outputs the difference between neighboring charge amounts, i.e., a value obtained by subtracting a charge amount obtained at the OFF timing of the light-emitting element 41 from that at the ON timing.

An example of the output waveforms of the linear sensors 20X and 20Y obtained at that time will be explained below using FIG. 9.

Figure 9:
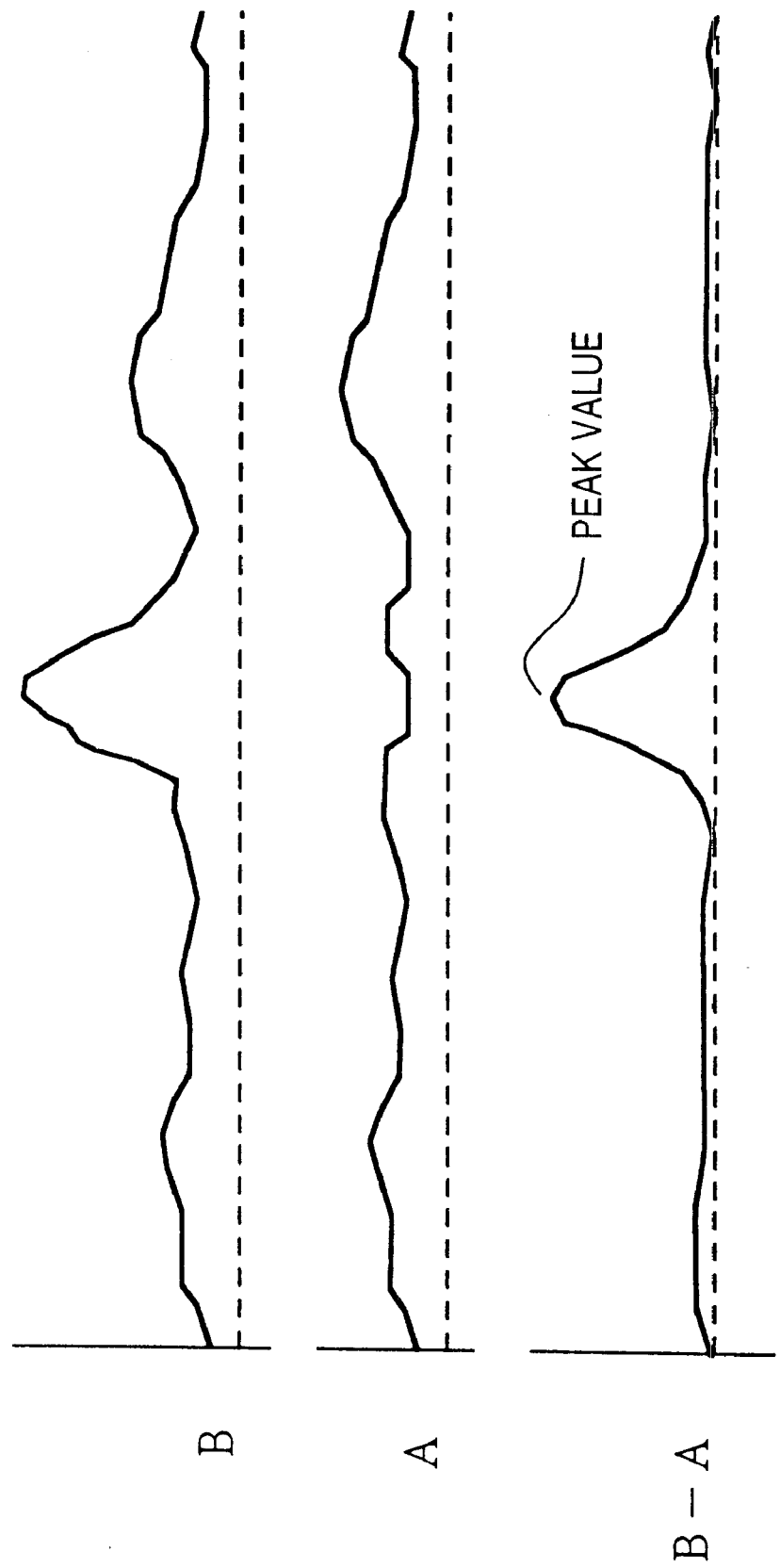
FIG. 9 is a waveform chart showing an example of the output waveforms of the linear sensors of the first embodiment.

FIG. 9 shows an example of the output waveforms of the linear sensors of the first embodiment.

In FIG. 9, a waveform B is formed by reading only signals at the ON timing of the light-emitting element 41, and a waveform A is obtained at the OFF timing, i.e., formed by only disturbance light (as shown in FIG. 8, the ring CCD 26 stores charges of pixels corresponding to these waveforms A and B at neighboring positions). The amplifier 29 nondestructively amplifies and outputs the difference value (waveform B–A) between the neighboring charge amounts. In this manner, a signal of an image formed by only light coming from the pointing tool 4 can be obtained, and a stable coordinate input can be attained without being influenced by disturbance light (noise).

If the maximum value of the waveform B–A shown in FIG. 9 is defined as a PEAK value, the PEAK value increases with increasing accumulation time in which the linear sensors 20X and 20Y respond to light. In other words, if the time for one period of the signal IRCLK is defined to be a unit accumulation time, and an accumulation count (the number of times of accumulation) n is defined using that time as a unit, the PEAK value increases with increasing accumulation count n. By detecting if the PEAK value reaches a predetermined value TH1, an output waveform having given quality can always be obtained.

Figure 10:
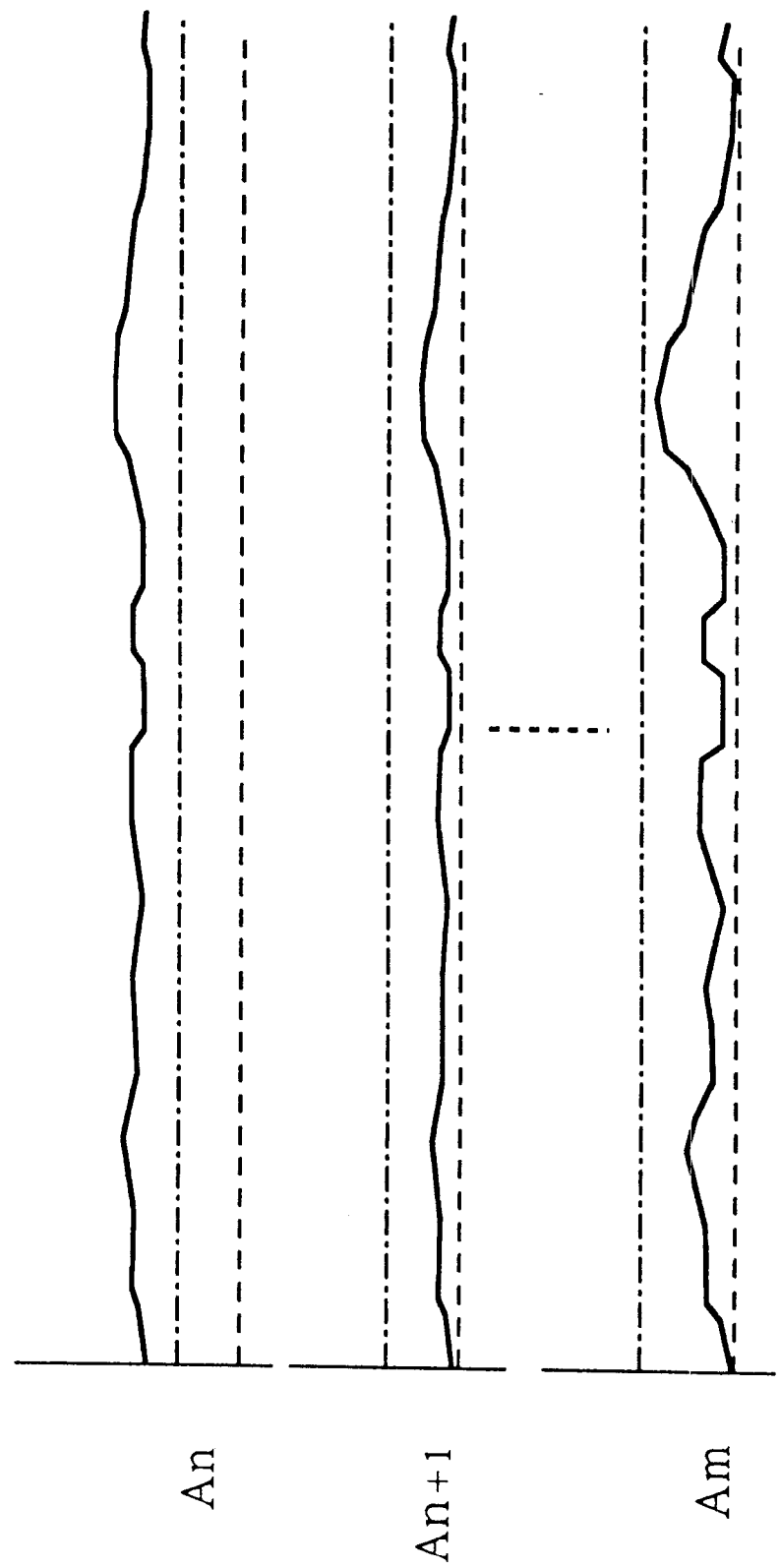
FIG. 10 is a waveform chart showing an example of the output waveforms to explain skimming in the linear sensors of the first embodiment.

On the other hand, when disturbance light is very intense, the transferred charges of the ring CCD 26 may be saturated before the peak of the differential waveform B–A reaches a sufficient value. In consideration of such case, each of the linear sensors 20X and 20Y has a SKIM section 28 having a skim function. The SKIM section 28 monitors the level of a non-emission signal, and in FIG. 10 when the signal level has exceeded a predetermined value in a waveform An obtained by n-th accumulation (one-dashed chain curve in FIG. 10), the SKIM section 28 skims a predetermined amount of charges from pixels corresponding to the waveforms A and B. In this manner, a waveform An+1 is obtained by the next (n+1)-th accumulation, and by repeating this process, accumulation of the signal charges can proceed without being saturated even under very intense disturbance light.

Therefore, even when the amount of flickering light coming from the pointing tool 4 is very small, a signal waveform having a sufficiently large magnitude can be obtained by repeating integrating operations a large number of times. Especially, when the pointing tool 4 uses a light-emitting source of the visible light range, since a signal of a display image is superposed, a sharp waveform which suffers little noise can be obtained using the aforementioned skim function and differential output.

The operation control of the linear sensors 20X and 20Y will be described below using FIG. 11.

Figure 11:
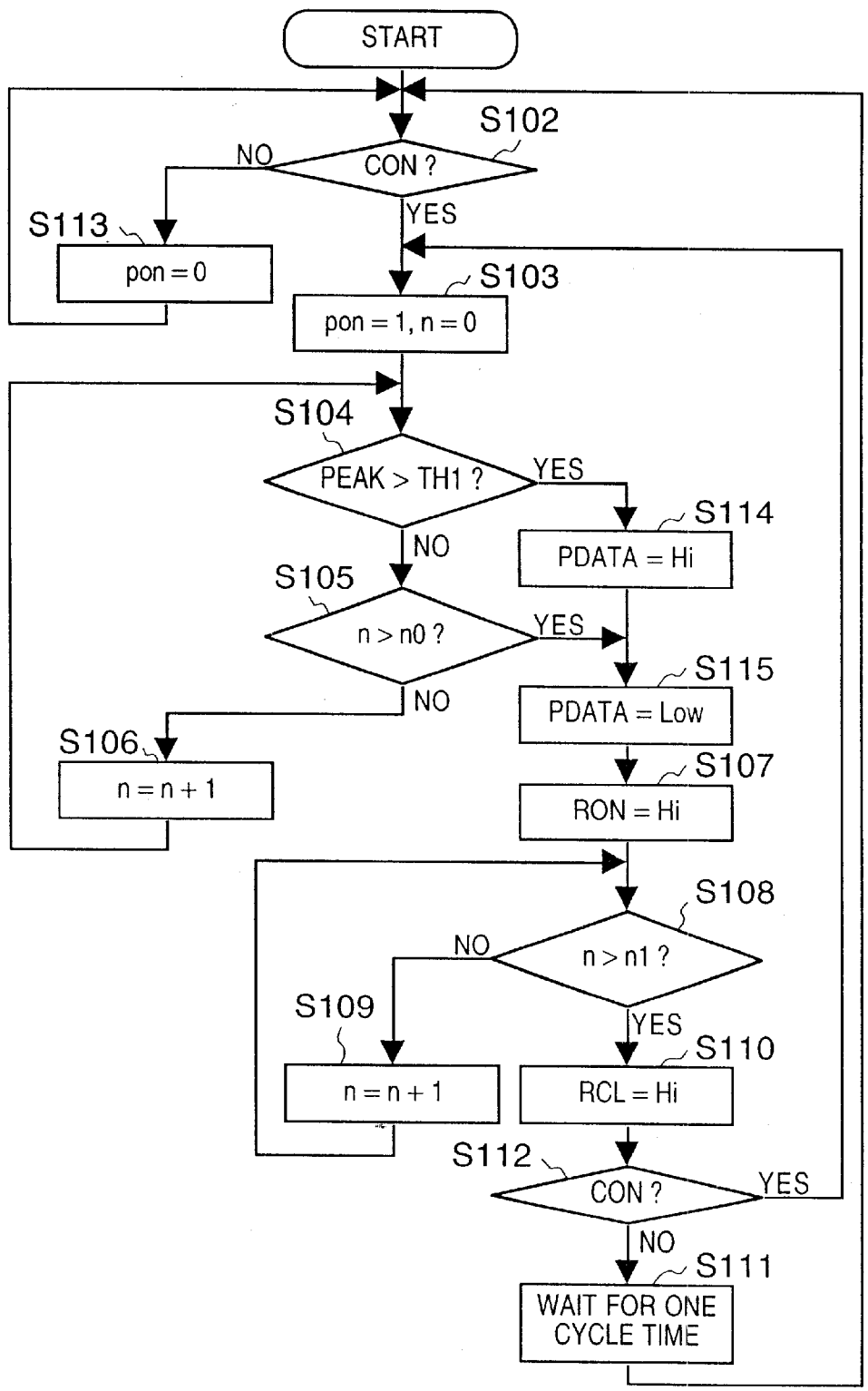
FIG. 11 is a flow chart showing the operation control of the linear sensors of the first embodiment.

FIG. 11 is a flow chart showing the operation control of the linear sensor of the first embodiment. When the sensor controller 31 starts sensor control, it monitors a signal CON in step S102. If the signal CON is at high level (YES in step S102), the flow advances to step S103 to reset the accumulation count n to zero, and to set an operation flag pon at 1. It is then checked in step S104 if the PEAK value (peak level) of the sensor output is larger than a predetermined value TH1.

If the PEAK value is smaller than the predetermined value TH1 (NO in step S104), it is checked in step S105 if the accumulation count n is larger than a first predetermined count n0. If the accumulation count n is smaller than the first predetermined count n0 (NO in step S105), the flow advances to step S106 to increment the accumulation count n by 1, and the flow returns to step S104. On the other hand, if the PEAK value is larger than the predetermined value TH1 (YES in step S104) or if the accumulation count n is larger than the first predetermined count n0 (YES in step S105), the flow advances to step S107 to set an integration stop signal ROM at high level (H), thus stopping integration. Then, the coordinate operation unit 32 starts a coordinate operation process.

After that, it is checked in step S108 if the accumulation count n is larger than a second predetermined count n1. If the accumulation count n is smaller than the second predetermined count n1 (NO in step S108), the flow advances to step S109 to increment the accumulation count n by 1, and the flow returns to step S108. On the other hand, if the accumulation count n is larger than the second predetermined count n1 (YES in step S108), the flow advances to step S110 to set the integration stop signal ROM at low level, and to set the sensor reset signal RCL at high level during a period corresponding to an integer multiple (twice in FIG. 6) of the cycle of the signal LCK. In step S112, the signal CON is monitored. If the signal CON is at high level (YES in step S112), the flow returns to step S103. On the other hand, if the signal CON is at low level (NO in step S112), the flow advances to step S111 to wait for one cycle time.

That is, this operation repeats itself while the signal CON is at high level, and a coordinate value operation is made at a cycle defined by the predetermined count n1. Even when the signal CON has dropped due to the influence of dust or the like, step S111 is inserted to hold the current state only once. If the signal CON is at low level during two successive cycle times (NO in step S102), the flow advances to step S113 to reset the operation flag pon to zero, i.e., to set a sync signal wait state, thus returning to an initial state.

This dropout measure step may have a cycle time longer than one cycle time. If disturbance is less intense, the period may be shortened. Note that the one cycle time may be set to match a natural number multiple of the cycle time of the aforementioned data block, i.e., to match the timing of the sync code, and a sync code detection signal may be used in place of the signal CON, thus allowing the same operation.

Light from the pointing tool 4 that reaches the coordinate detector 1 varies as the power supply unit (battery) 44 built in the pointing tool 4 is consumed, and also varies depending on the posture of the pointing tool 4. Especially, when the reflecting screen 10 has low light diffusion characteristics, the front luminance of the displayed image improves, but variations of the amount of light input to the sensor, that depend on the posture of the pointing tool 4 increase. However, in the present invention, the number of times of integration automatically compensates to always obtain a stable output signal even in such case, thus allowing stable coordinate detection. If light which does not diffuse so largely enters the sensor as a pointer, the incoming light is considerably intense. Even in such case, stable coordinate detection is assured.

When both a pen that uses an LED and comes in direct contact with the screen upon use, and a pointer are used together, since an LED having a larger amount of light can be used, the first and second predetermined counts n0 and n1 as the numbers of times of integration may be switched by discriminating the pen or pointer using an ID signal so as to make sampling at high speed in case of the pen or at low speed in case of the pointer. In practice, with the pointer it is hard to make delicate drawing operation such as character input, and it is convenient to draw a smooth line by low-speed sampling. Hence, such switching is effective.

As described above, since an RF carrier is added to flickering light and the timing of the integrating operation is controlled by a demodulated signal of a predetermined cycle obtained by frequency-detecting that carrier, a coordinate input device which can cordlessly synchronize the pointing tool and image sensing section and is easy to use can be realized. Also, since a laser beam is used, easy operation at a position separated from the screen can be assured. Furthermore, since an integration control means which monitors the peak level of a differential signal from the integrating section and stops integration is provided, even when the amount of light has changed, a beam spot image signal having nearly a constant level can be generated and, hence, a stable coordinate operation result with high resolving power can always be obtained.

<Coordinate Value Operation>

The coordinate operation process in the coordinate operation unit 32 will be described below.

Figure 12:
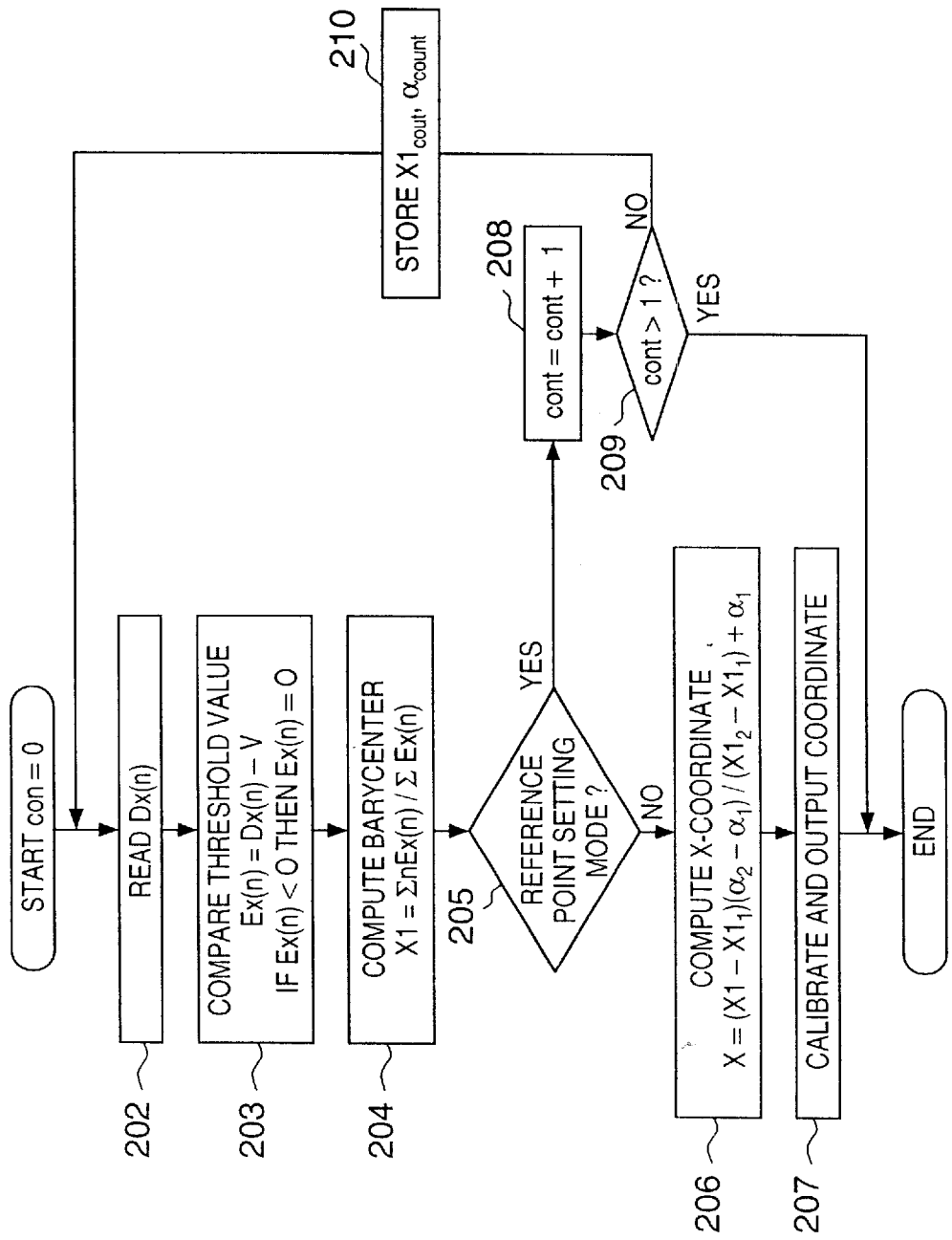
FIG. 12 is a flow chart showing the coordinate operation process in a coordinate operation unit of the first embodiment.

FIG. 12 is a flow chart showing the coordinate operation process in the coordinate operation unit of the first embodiment.

The output signals (differential signals from the amplifiers 29) from the two linear sensors 20X and 20Y obtained as described above are sent to the coordinate operation unit 32 as digital signals converted by the A/D converter 31A connected to the sensor controller 31, and coordinate values are computed. The coordinate value (X1, Y1) on the sensor is computed from the output data in the X- and Y-coordinate directions. Note that the same operation process is done for the X- and Y-coordinates, and only the operation process of the X-coordinate value will be explained.

In step S202, differential data Dx(n) (in the first embodiment, the number n of pixels=64) as a differential signal of given pixels at an arbitrary coordinate input point (a predetermined point with a known coordinate value in a reference point setting mode to be described later) is read, and is stored in a buffer memory (not shown). In step S203, the data Dx(n) is compared with a threshold value V set in advance to compute a data value Ex(n) equal to or larger than the threshold value. Using this data value Ex(n), a coordinate X1 on the sensor is computed in step S204.

In the first embodiment, the barycenter of output data is computed by a barycenter method, i.e.:

$$X1 = \Sigma n Ex(n) / \Sigma Ex(n)$$

but the computation method is not particularly limited (for example, a method of obtaining a peak value of the data value Ex(n) (by, e.g., a differential method) may be used).

In step S205, the mode of the coordinate operation process is checked. In order to compute a coordinate from barycenter X1 of output data, a predetermined value must be obtained in advance, and a method of calculating that predetermined value (reference point setting mode) will be explained.

Again, an explanation will be given for only the X-direction. The pointing tool 4 is located at points ($\alpha 1$, $\beta 1$) and ($\alpha 2$, $\beta 2$), the X- and Y-coordinates of which are known, on the reflecting screen 10, steps S202 to S204 are executed to compute barycentric values $X1_1$ and $X1_2$ of the X-direction sensor obtained at the respective points, and these values and known coordinate values $\alpha 1$ and $\alpha 2$ are stored in step S210. Using the stored values, the X-coordinate of a coordinate input point to be computed can be computed in step S206 in normal coordinate computation. This formula is:

$$X\text{-coordinate} = (X1 - X1_1)(\alpha 2 - \alpha 1)/(X1_2 - X1_1) + \alpha 1$$

In step S207, a calibration operation for, e.g., correcting distortion by software operations to correct lens aberrations of an optical system, and the aforementioned correction operation are made.

That is, the correction operation divides a coordinate value, which has been calibrated using the magnification and shift correction amount sent from the image processor 81, by the magnification, and subtracts the shift amount from the quotient, thus determining the coordinate value.

The determined coordinate can be directly output in real time, and data can be decimated (e.g., only one data of every 10 determined coordinates is output) in correspondence with the purpose of use. Such decimation process is important when the following specifications are assumed.

When the pointing tool 4 is used like a pen, the stability of the user's hand is different from that when it is used as a pointer at a position separated from the screen. When the pointing tool 4 is used as a pointer, since the cursor on the screen tends to oscillate finely, the pointer becomes easier to use by suppressing such fine movement. On the other hand, when the pointing tool 4 is used like a pen, it is required to faithfully and quickly follow the movement of the pen. Especially, upon writing a character, it cannot be correctly input unless fine, quick operation is allowed.

In the first embodiment, whether the pointing tool is used as a pointer or pen, i.e., whether or not the distal end switch has been pressed, can be determined since the ID is sent using the control signal. If the pointing tool is used as a pointer, the moving mean is computed using two previous output coordinate values (X−1, Y−1) and (X−2, Y−2) to compute the current output coordinate value (X, Y), thus allowing high operability free from oscillation. In this case, a simple moving mean is used. As functions used in such smoothing, a method of nonlinearly compressing a difference absolute value depending on its magnitude, a method of nonlinearly compressing a difference from a predicted value obtained based on the moving mean, and the like are available.

That is, since smoothing can be switched between relatively strong and weak effects by the control signal depending on whether or not the pointing tool is used as a pointer, easy operation can be realized in accordance with the purpose of use of the pointing tool. In this respect, the effect of the present invention is tremendous.

Note that these operation processes can be completed within 10 msec when the coordinate sampling frequency is 100 Hz, as described above. Since original data is as very small as 64 pixels×2 (x and y)×8 bits (A/D converter), and no convergence operation is required, processes can be sufficiently done by a low-speed, 8-bit one-chip microprocessor. Such fact is advantageous not only for a cost reduction but also for a short developing term, and easy developments of various secondary products. Especially, the need for developing a dedicated LSI required for high-speed image data processes using an area sensor can be obviated, and superiority in terms of the developing cost, term, and the like is very high.

Data signals indicating the coordinate values (X, Y) computed by the aforementioned operation process are sent from the coordinate operation unit 32 to the communication controller 33. The communication controller 33 receives the data signals, and a control signal from the control signal detector 72. These data signals and control signal are converted into communication signals in a predetermined format, and the converted signals are sent to an external display control device. In this manner, various operations such as cursor movement, menu selection, input of a character/line image, and the like on the reflecting screen 10 can be made. As described above, a coordinate input device which can assure resolving power beyond 1,000 and sufficiently high accuracy even when 64-pixel sensors are used, can use compact, low-cost sensors and optical systems, and can reduce the circuit scale of the operation circuit can be obtained.

When the sensor uses an area sensor, doubling the resolving power requires 4×pixels and operation data, while when the sensor uses a linear sensor, such resolving power can be attained by only doubling the pixels of the X- and Y-coordinates. Hence, higher resolving power can be easily attained by increasing the number of pixels.

As described above, according to the first embodiment, the linear sensors 20X and 20Y are laid out to make right angles as an image sensing means for sensing an image of the beam spot 5 generated at an arbitrary position on the reflecting screen 10 by the pointing tool 4, and are attached so that their front positions on the detection coordinate axes substantially agree with the optical axis of the projection lens 86, so as to produce substantially zero disparity even when the field angle has changed or the setting state suffers trapezoidal distortion. In this manner, a compact, lightweight, low-cost coordinate input device which can obtain high-accuracy, high-resolving power coordinate values, and can suppress influences of disturbance light can be realized.

Therefore, when the setting state must be frequently changed like a portable front projection type projector, easy setting/adjustment is allowed. Also, since the imaging optical system uses a cylindrical lens or slit that forms a linear image so as to form an image parallel to the detection coordinate axis, the influence of tilt errors of the linear sensors 20X and 20Y can be eliminated, thus allowing easy assembly.

Each of the linear sensors 20X and 20Y comprises the sensor array 21 in which a plurality of photoelectric conversion sensors are arranged linearly, and the integrating section 22 which includes charge transfer blocks coupled in a ring pattern, and independently integrates and holds output charges from each sensor as signals at ON and OFF timings in synchronism with the predetermined cycle time. The coordinate operation unit 32 makes a coordinate operation by converting a difference signal between the ON and OFF signals in the integrating section 22 into digital data with a data with of n bits or more, and outputs a coordinate value having a resolving power around $2^n$ times the number of pixels of the sensor array 21. In this way, a coordinate input device which can suppress disturbance light and can detect coordinates with high resolving power can be realized.

Also, since the coordinate operation unit 32 can detect status values of optical or electrical correction of a change in field angle or trapezoidal distortion, a coordinate input device that can output automatically corrected coordinates can be realized, thus facilitating setup processes.

[Second Embodiment]

Figure 13:
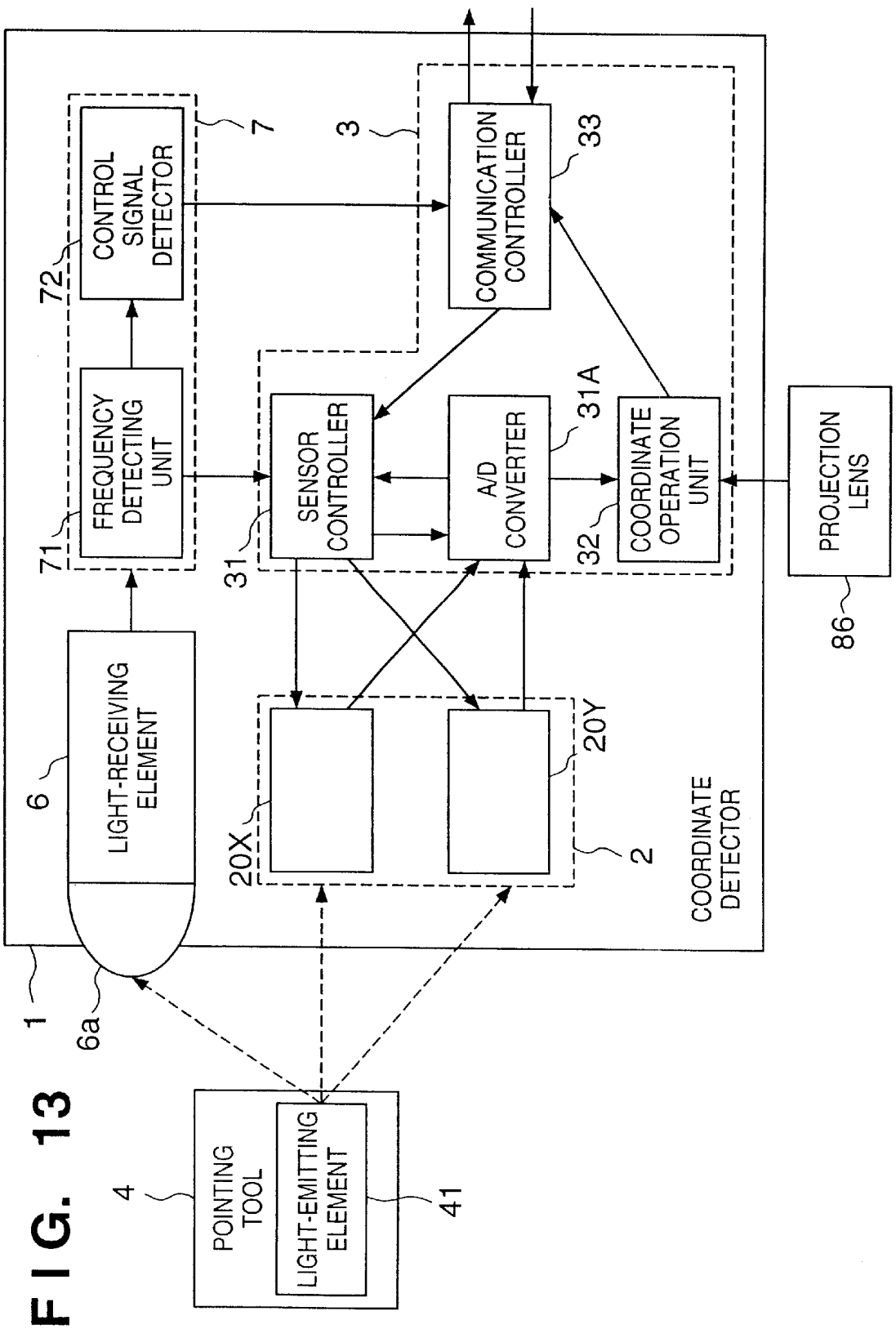
FIG. 13 is a block diagram showing the arrangement of a coordinate detector according to the second embodiment of the present invention in detail.

FIG. 13 shows details of the arrangement of a coordinate detector of the second embodiment.

Note that the same reference numerals in FIG. 13 denote the same parts as in FIG. 1, and a detailed description thereof will be omitted.

As shown in FIG. 13, when the magnification and shift are only optical ones, field angle information or the like detected by the projection lens 86 may be directly output to the coordinate operation unit 32 in place of detecting a field angle by the detector 88 unlike in the first embodiment.

[Third Embodiment]

Figure 15:
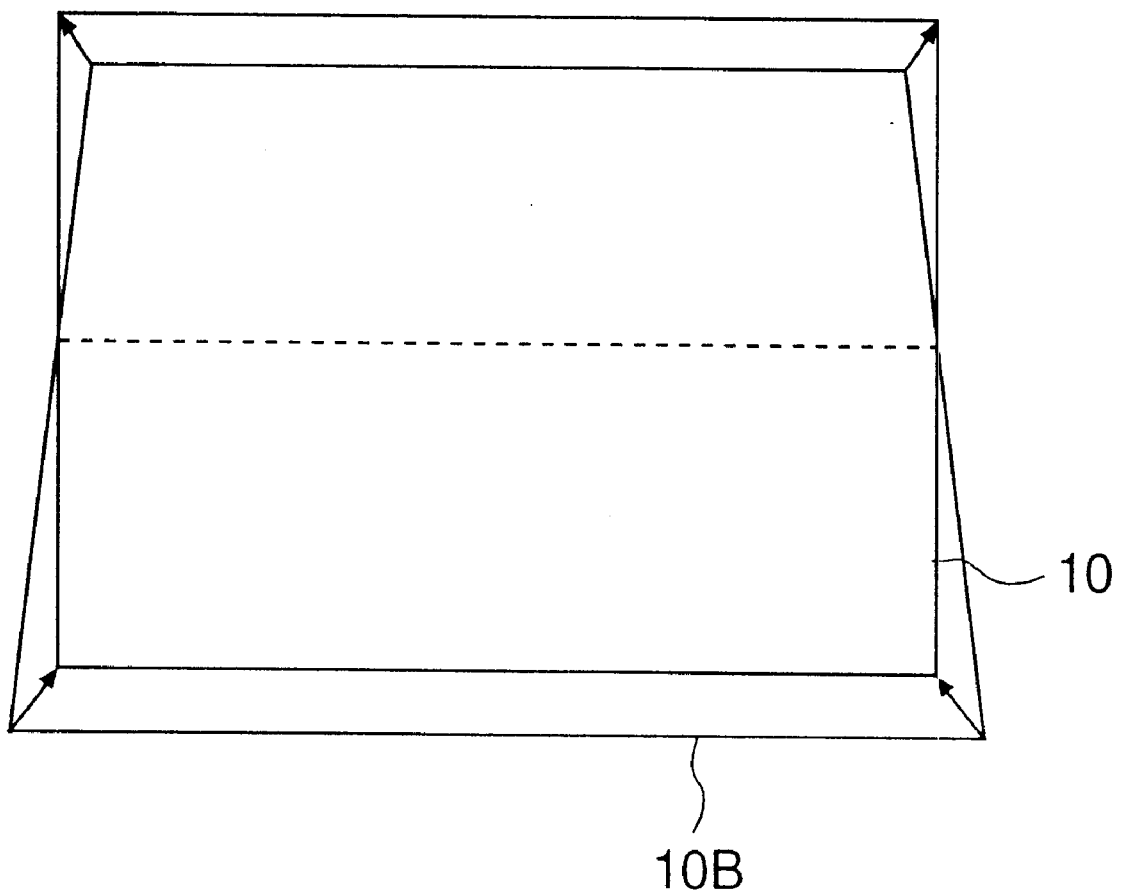
FIG. 15 is a view for explaining optical trapezoidal distortion correction in the third embodiment.

FIGS. 14 and 15 are views for explaining a trapezoidal distortion correction function of the image signal processor 81 of the third embodiment.

As shown in FIG. 14, when the image processor 81 has a function of electronically correcting a trapezoidal distortion, e.g., of correcting a trapezoid 10A to a rectangle 10, this correction information is sent to the coordinate operation unit 32, thus allowing correction.

As shown in FIG. 15, when a trapezoidal distortion is to be optically corrected (e.g., a trapezoid 10B to a rectangle 10), such distortion is detected by the projection lens 86, and is sent to the coordinate operation unit 32, thus allowing correction.

In the above embodiments, the coordinate operation unit 32 makes various kinds of correction. Alternatively, an externally connected device may make correction.

In FIG. 7, the two linear sensors 20X and 20Y are both set at positions near the optical axis of the projection lens 86. If one of these linear sensors is set at such position, the same effect as described in the above embodiment can be obtained.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the flow charts shown in FIGS. 11 and 12 mentioned above.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input device for generating a coordinate value corresponding to a light spot which is generated by irradiating a predetermined position of a coordinate input screen with light coming from a pointing tool or corresponds to a light-emitting portion provided at a distal end of the pointing tool located near the coordinate input screen, comprising:

an image display unit, having an optical system, for generating the coordinate input screen;

image sensing means for sensing an image of the light spot;

adjusting means for performing enlargement for a coordinate input screen image by adjusting a field angle of the optical system;

detection means for detecting a field angle correction state of the optical system of said image display unit on the basis of an adjustment amount by said adjusting means, and outputting correction information; and coordinate operation means for operating a coordinate value corresponding to the light spot on the basis of the correction information and an output signal from said image sensing means.

2. The device according to claim 1, wherein the correction information indicates a setting state of an optical system of said image display unit.

3. The device according to claim 1, wherein the correction information indicates an image state of an image displayed by said image display unit.

4. The device according to claim 1, wherein said image sensing means comprises first image sensing means, constructed by a first sensor on a first coordinate axis, for sensing the image of the light spot, and second image sensing means, constructed by a second sensor on a second coordinate axis, for sensing the image of the light spot, and the first and second coordinate axes are perpendicular to each other, and at least one of the first and second sensors is set with a predetermined direction and position on the coordinate axis thereof substantially agreeing with an optical axis of the optical system.

5. A method of controlling a coordinate input device for generating a coordinate value corresponding to a light spot which is generated by irradiating a predetermined position of a coordinate input screen with light coming from a pointing tool or corresponds to a light-emitting portion provided at a distal end of the pointing tool located near the coordinate input screen, comprising:

an image displaying step of, in an image display unit having an optical system, generating the coordinate input screen;

an image sensing step of sensing an image of the light spot using an image sensing unit;

an adjusting step of performing enlargement for a coordinate input screen image;

a detecting step of detecting a field angle correction state of the optical system of the image display unit on the basis of an adjustment amount from said adjusting step, and outputting correction information; and a coordinate operation step of operating a coordinate value corresponding to the light spot on the basis of the correction information and an output signal from the image sensing unit.

6. The method according to claim 5, wherein the correction information indicates a setting state of an optical system of the image display unit.

7. The method according to claim 5, wherein the correction information indicates an image state of an image displayed by the image display unit.

8. The method according to claim 5, wherein the image sensing unit comprises first image sensing means, constructed by a first sensor on a first coordinate axis, for sensing the image of the light spot, and second image sensing means, constructed by a second sensor on a second coordinate axis, for sensing the image of the light spot, and the first and second coordinate axes are perpendicular to each other, and at least one of the first and second sensors is set with a predetermined direction and position on the coordinate axis thereof substantially agreeing with an optical axis of the optical system.

9. A computer-readable memory that stores a program for controlling a coordinate input device for generating a light spot by irradiating a predetermined position of a coordinate input screen with light coming from a pointing tool, and generating a coordinate value corresponding to the light spot, comprising:

program code of an image displaying step for, in an image display unit having an optical system, generating the coordinate input screen;

program code of an image sensing step of sensing an image of the light spot using an image sensing unit;

program code of an adjusting step of performing enlargement for a coordinate input screen image;

program code of a detecting step of detecting a field angle correction state of the optical system of the image display unit on the basis of an adjustment amount from said adjusting step, and outputting correction information; and program code of a coordinate operation step of operating a coordinate value corresponding to the light spot on the basis of the correction information and an output signal from the image sensing unit.

10. A coordinate input device which comprises a projection-type image display unit, a pointing tool which generates a light spot at an arbitrary position within a predetermined coordinate input region including an image display region of said projection-type image display unit or has at a distal end thereof a light-emitting portion that serves as a light spot when said pointing tool is located near a coordinate input screen, and image sensing means for sensing an image of the light spot, comprising:

adjusting means for performing enlargement for a coordinate input screen image;

detection means for detecting a field angle correction state of a projection optical system of said projection-type image display unit on the basis of an adjustment amount by said adjusting means, and outputting correction information; and coordinate operation means for generating a coordinate output signal corresponding to a position of the light spot within the coordinate input region on the basis of a signal sensed by said image sensing means using the correction information output from said detection means.

11. The device according to claim 10, wherein said image sensing means has a pair of sensors for respectively detecting coordinates in two orthogonal X- and Y-axis directions, and at least one axial direction of the pair of sensors is set to substantially agree with an optical axis of a projection lens of said projection-type image display unit.

12. The device according to claim 11, wherein each of the pair of sensors has a sensor array in which a plurality of photoelectric conversion sensors are arranged linearly, and
    integrating means which includes charge transfer blocks coupled in a ring pattern, and independently integrates and holds output charges from each sensor as signals at ON and OFF timings in synchronism with a predetermined cycle time, and
    said coordinate operation means makes a coordinate operation by converting a difference between ON and OFF signals in said integrating means into digital data with a data width of not less than n bits, and outputs a coordinate value having a resolving power approximately $2^n$ times the number of pixels of the sensor array.

13. A coordinate input device which comprises a projection-type image display unit, a pointing tool which generates a light spot at an arbitrary position within a predetermined coordinate input region including an image display region of said projection-type image display unit or has at a distal end thereof a light-emitting portion that serves as a light spot when said pointing tool is located near a coordinate input screen, and image sensing means for sensing an image of the light spot, comprising:
    adjusting means for performing enlargement for a coordinate input screen image by adjusting a field angle of said projection-type image display unit, and outputting screen correction information of a size of a displayed image of said projection-type image display unit; and
    coordinate operation means for generating a coordinate output signal corresponding to a position of the light spot within the coordinate input region on the basis of a signal sensed by image sensing means using the screen correction information.

14. The device according to claim 13, wherein said image sensing means has a pair of sensors for respectively detecting coordinates in two orthogonal X- and Y-axis directions, and
    at least one axial direction of the pair of sensors is set to substantially agree with an optical axis of a protection lens of said projection-type image display unit.

15. The device according to claim 14, wherein each of the pair of sensors has a sensor array in which a plurality of photoelectric conversion sensors are arranged linearly, and
    integrating means which includes charge transfer blocks coupled in a ring pattern, and independently integrates and holds output charges from each sensor as signals at ON and OFF timings in synchronism with a predetermined cycle time, and
    said coordinate operation means makes a coordinate operation by converting a difference between ON and OFF signals in said integrating means into digital data with a data width of not less than n bits, and outputs a coordinate value having a resolving power approximately $2^n$ times the number of pixels of the sensor array.

16. A method of controlling a coordinate input device which comprises a projection-type image display unit, a pointing tool which generates a light spot at an arbitrary position within a predetermined coordinate input region including an image display region of the projection-type image display unit or has at a distal end thereof a light-emitting portion that serves as a light spot when the pointing tool is located near a coordinate input screen, and an image sensing unit for sensing an image of the light spot, comprising:
    an adjusting step of performing enlargement shift for a coordinate input screen image;
    a detection step of detecting a field angle correction state of a projection optical system of the projection-type image display unit on the basis of an adjustment amount from said adjusting step, and outputting correction information of a size of a displayed image of the projection-type image display unit; and
    a coordinate operation step of generating a coordinate output signal corresponding to a position of the light spot within the coordinate input region on the basis of a signal sensed by the image sensing unit using the correction information output from said detection step.

17. The method according to claim 16, wherein the image sensing unit has a pair of sensors for respectively detecting coordinates in two orthogonal X- and Y-axis directions, and
    at least one axial direction of the pair of sensors is set to substantially agree with an optical axis of a projection lens of the projection-type image display unit.

18. The method according to claim 17, wherein each of the pair of sensors has a sensor array in which a plurality of photoelectric conversion sensors are arranged linearly, and
    integrating means which includes charge transfer blocks coupled in a ring pattern, and independently integrates and holds output charges from each sensor as signals at ON and OFF timings in synchronism with a predetermined cycle time, and
    the coordinate operation unit makes a coordinate operation by converting a difference between ON and OFF signals in the integrating means into digital data with a data width of not less than n bits, and outputs a coordinate value having a resolving power approximately $2^n$ times the number of pixels of the sensor array.

19. A method of controlling a coordinate input device which comprises a projection-type image display unit, a pointing tool which generates a light spot at an arbitrary position within a predetermined coordinate input region including an image display region of the projection-type image display unit or has at a distal end thereof a light-emitting portion that serves as a light spot when said pointing tool is located near a coordinate input screen, and an image sensing unit for sensing an image of the light spot, comprising:
    an adjusting step of performing enlargement for a coordinate input screen image by adjusting a field angle of the projection-type image display unit, and outputting screen correction information of a size of a displayed image of the projection-type image display unit; and
    a coordinate operation step of generating a coordinate output signal corresponding to a position of the light spot within the coordinate input region on the basis of a signal sensed by the image sensing unit using the screen correction information.

20. The method according to claim 19, wherein the image sensing unit has a pair of sensors for respectively detecting coordinates in two orthogonal X- and Y-axis directions, and
    at least one axial direction of the pair of sensors is set to substantially agree with an optical axis of a projection lens of the projection-type image display unit.

21. The method according to claim 20, wherein each of the pair of sensors has a sensor array in which a plurality of photoelectric conversion sensors are arranged linearly, and integrating means which includes charge transfer blocks coupled in a ring pattern, and independently integrates and holds output charges from each sensor as signals at ON and OFF timings in synchronism with a predetermined cycle time, and the coordinate operation unit makes a coordinate operation by converting a difference between ON and OFF signals in the integrating means into digital data with a data width of not less than n bits, and outputs a coordinate value having a resolving power approximately $2^n$ times the number of pixels of the sensor array.

22. A computer-readable memory that stores program code for controlling a coordinate input device which comprises a projection-type image display unit, a pointing tool for generating a light spot at an arbitrary position within a predetermined coordinate input region including an image display region of the projection-type image display unit, and an image sensing unit for sensing an image of the light spot, comprising:

program code of an adjusting step of performing enlargement for a coordinate input screen image;

program code of a detection step of detecting a field angle correction state of a projection optical system of the projection-type image display unit on a basis of an adjustment amount from said adjusting step, and outputting correction information of a size of a displayed image of the projection-type image display unit; and program code of a coordinate operation step of generating a coordinate output signal corresponding to a position of the light spot within the coordinate input region on the basis of a signal sensed by the image sensing unit using the correction information output from said detection step.

23. A computer-readable memory that stores program code for controlling a coordinate input device which comprises a projection-type image display unit, a pointing tool which generates a light spot at an arbitrary position within a predetermined coordinate input region including an image display region of the projection-type image display unit or has at a distal end thereof a light-emitting portion that serves as a light spot when the pointing tool is located near a coordinate input screen, and an image sensing unit for sensing an image of the light spot, comprising:

program code of an adjusting step of performing enlargement shift for a coordinate input screen image by adjusting a field angle of the projection-type image display unit, and outputting screen correction information of a size of a displayed image of the projection-type image display unit; and program code of a coordinate operation step of generating a coordinate output signal corresponding to a position of the light spot within the coordinate input region on the basis of a signal sensed by the image sensing unit using the screen correction information.

* * * * *

UNITED STATES PATENT AND TRADEMARK OFFICE
CERTIFICATE OF CORRECTION

PATENT NO. : 6,847,356 B1
DATED : January 25, 2005
INVENTOR(S) : Masahide Hasegawa et al.

It is certified that error appears in the above-identified patent and that said Letters Patent is hereby corrected as shown below:

Column 17,
Line 55, "with" should read -- width --.

Signed and Sealed this

Second Day of August, 2005

JON W. DUDAS
*Director of the United States Patent and Trademark Office*